United States Patent [19]
Tamatsu et al.

[11] Patent Number: 5,619,208
[45] Date of Patent: Apr. 8, 1997

[54] FM-CW RADAR SYSTEM

[75] Inventors: Yukimasa Tamatsu; Hiroshi Hazumi; Hiroto Nakatani, all of Kariya, Japan

[73] Assignee: Nippondenso Co., Ltd., Kariya, Japan

[21] Appl. No.: 590,829

[22] Filed: Jan. 24, 1996

[30] Foreign Application Priority Data

Jan. 24, 1995 [JP] Japan .................................. 7-009059
Oct. 26, 1995 [JP] Japan .................................. 7-279129

[51] Int. Cl.⁶ .......................... G01S 13/536; G01S 13/93
[52] U.S. Cl. ................. 342/70; 342/87; 342/115; 342/128; 342/192; 342/200
[58] Field of Search .................. 342/70, 71, 72, 342/87, 99, 111, 115, 116, 128, 192, 196, 200

[56] References Cited

U.S. PATENT DOCUMENTS

| | | | |
|---|---|---|---|
| 3,953,851 | 4/1976 | Weidstam | 342/14 |
| 4,118,701 | 10/1978 | Fletcher et al. | 342/200 |
| 4,633,253 | 12/1986 | Stove et al. | 342/162 |
| 4,825,214 | 4/1989 | Dejaegher | 342/128 |
| 5,023,618 | 6/1991 | Reits | 342/128 |
| 5,046,010 | 9/1991 | Tomasi | 342/122 X |
| 5,268,692 | 12/1993 | Grosch et al. | 342/70 |
| 5,270,720 | 12/1993 | Stove | 342/174 |
| 5,325,097 | 6/1995 | Zhang et al. . | |
| 5,448,244 | 9/1995 | Komatsu et al. | 342/155 |
| 5,508,706 | 4/1996 | Tsou et al. | 342/192 |
| 5,546,088 | 8/1996 | Trummer et al. | 342/124 |

FOREIGN PATENT DOCUMENTS

| | | |
|---|---|---|
| 4-313090 | 11/1992 | Japan . |
| 5-40168 | 9/1993 | Japan . |
| 5-232214 | 9/1993 | Japan . |
| 7-20233 | 1/1995 | Japan . |
| 7-49378 | 2/1995 | Japan . |

*Primary Examiner*—John B. Sotomayor
*Attorney, Agent, or Firm*—Cushman Darby & Cushman IP Group of Pillsbury Madison & Sutro, LLP

[57] ABSTRACT

In an FM-CW radar system, a beat signal is frequency-analyzed for selecting ascending-side beat frequencies and descending-side beat frequencies for a plurality of targets. By pairing the ascending-side and descending-side beat frequencies one by one from each side, all possible combinations thereof are prepared. Based on these beat frequency combinations, beat frequency combinations after a given time are predicted, respectively. If an ascending-side beat frequency and a descending-side beat frequency of the predicted beat frequency combination are found in ascending-side beat frequencies and descending-side beat frequencies of a beat signal selected after the given time, respectively, or in the neighborhood of them, respectively, the predicted beat frequency combination of the found ascending-side and descending-side beat frequencies is set as a correct beat frequency combination. A further correct beat frequency combination/combinations can be set in the same manner. Based on these correct beat frequency combinations, information about the targets can be correctly achieved.

10 Claims, 17 Drawing Sheets

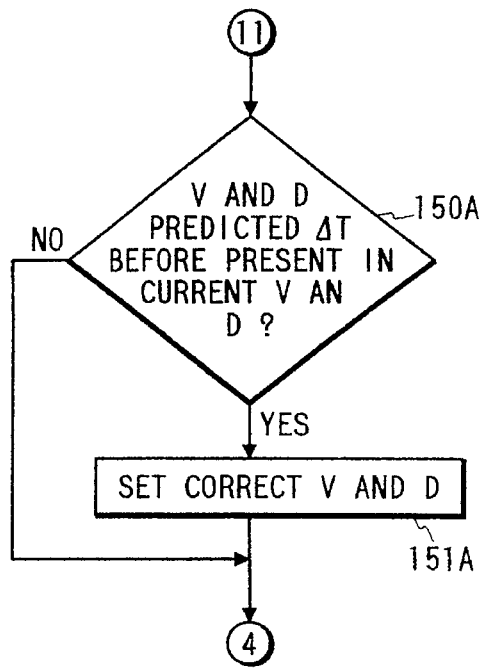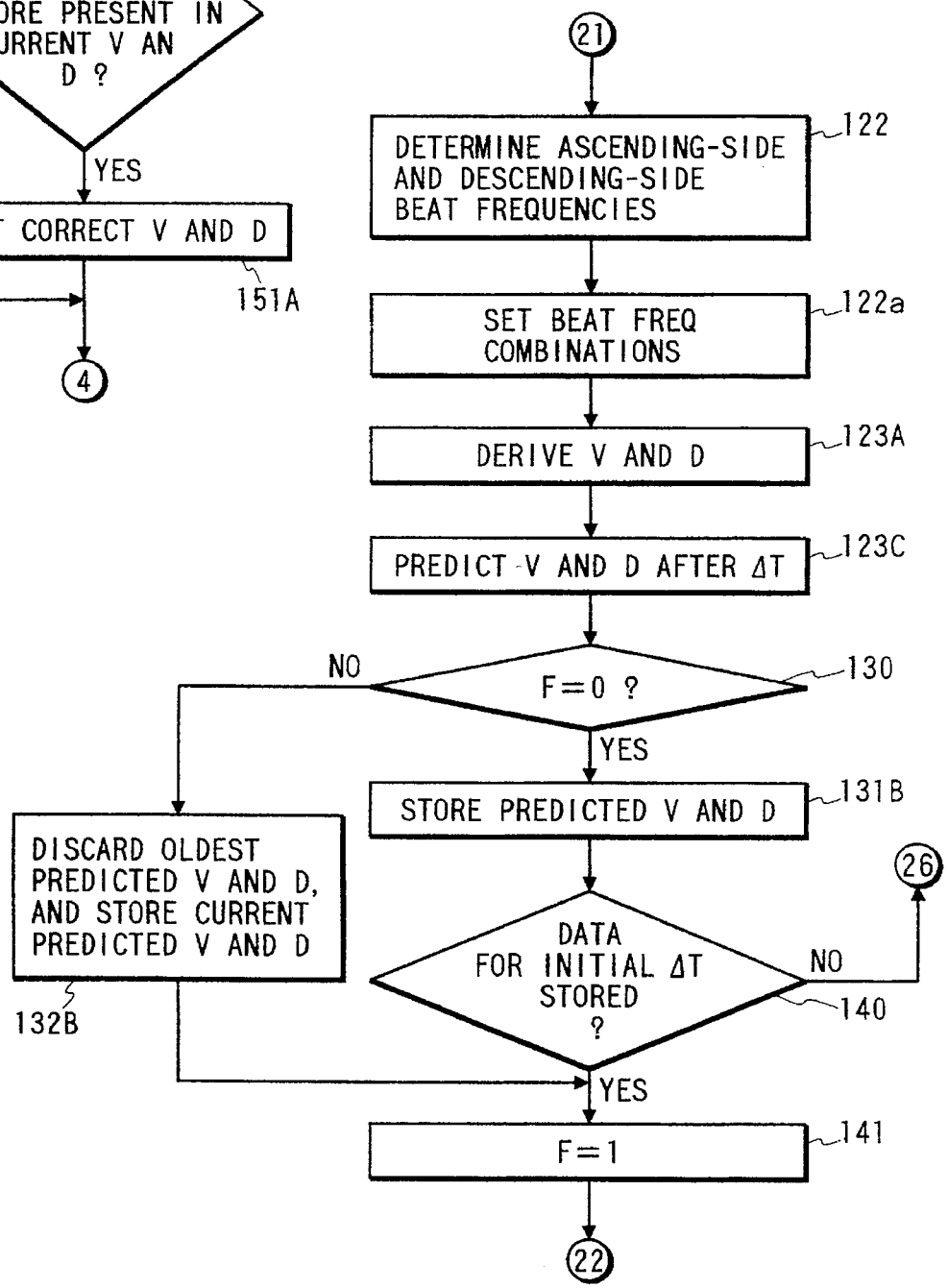

FM-CW RADAR SYSTEM

BACKGROUND OF THE INVENTION

1. Field of the Invention

The present invention relates to a radar system, and more specifically, to an FM-CW (frequency-modulated continuous wave) radar system.

2. Description of the Prior Art

In the FM-CW radar system, a relative velocity V of a target with respect to a signal transmitter and a range or distance D of the target from the signal transmitter are derived in the following manner:

A transmission signal, which is frequency-modulated using a modulating signal of a waveform having an ascending portion and a descending portion, is transmitted as a radio wave. Then, the transmitted radio wave is reflected by the target and received at the radar system. The received radio wave is formed into a received signal which is mixed with the transmission signal to produce a beat signal containing Doppler frequency components. Then, the beat signal is analyzed in frequency spectrum for selecting beat frequencies at regions thereof corresponding to the ascending portion and the descending portion of the modulating signal (hereinafter also referred to as "ascending-side beat frequency" and "descending-side beat frequency"), respectively. Using the selected beat frequencies, the distance D and the relative velocity V of the target are derived from equations (1) and (2) as follows, respectively:

$$D=\{C/(8\Delta F \cdot fm)\} \cdot (fb1+fb2) \quad (1)$$

$$V=\{C/(4f0)\} \cdot (fb1-fb2) \quad (2)$$

wherein $fb1$ and $fb2$ represent the ascending-side beat frequency and the descending-side beat frequency, respectively, $f0$ represents a center frequency of the frequency-modulated transmission signal, $\Delta F$ represents a frequency modulation width thereof, $fm$ represents a modulating frequency, and C represents the velocity of light.

On the other hand, if a plurality of targets exist, it is essential to precisely derive and select ascending-side and descending-side beat frequencies for each target so as to achieve correct calculation of a relative velocity and a distance of each of the targets with respect to the signal transmitter.

For example, it is assumed that four targets are present. If these four targets are stationary or stopped, since a beat signal does not include Doppler frequency components, combinations of ascending-side and descending-side beat frequencies are simply in order of frequency magnitudes. This is shown in Table 1, wherein the targets are identified by NO. 1 to NO. 4.

TABLE 1

| Target | Ascending-Side Beat Frequency | Descending-Side Beat Frequency |
|---|---|---|
| NO. 1 | fb11 | fb12 |
| NO. 2 | fb21 (>fb11) | fb22 (>fb 12) |
| NO. 3 | fb31 (>fb21) | fb32 (>fb22) |
| NO. 4 | fb41 (>fb31) | fb42 (>fb32) |

As appreciated from Table 1, by selecting the ascending-side beat frequencies and the descending-side beat frequencies in order of frequency magnitudes of the beat signal, the information about the four targets can be derived using the foregoing equations (1) and (2).

On the other hand, if each of the four targets has a relative velocity with respect to the signal transmitter, since the beat signal includes the Doppler frequency components, it is possible that the order of the ascending-side beat frequencies differs from the order of the descending-side beat frequencies with respect to the four targets. Thus, on such an occasion, the correct combinations of the ascending-side and descending-side beat frequencies can not be established simply in order of frequency magnitudes as opposed to Table 1. This particularly occurs when the targets are located in proximity to each other. Accordingly, the correct information about relative velocities and distances of the respective targets can not be achieved based on the combinations of the ascending-side and descending-side beat frequencies determined simply in order of frequency magnitudes.

SUMMARY OF THE INVENTION

Therefore, it is an object of the present invention to provide an improved FM-CW radar system. For example, it is an object of the present invention to provide an FM-CW radar system which is capable of establishing correct combinations of beat frequencies of a beat signal at regions thereof corresponding to ascending and descending portions of a modulating signal for correctly deriving information about a plurality of targets each having a relative velocity with respect to a signal transmitter.

According to one aspect of the present invention, an FM-CW radar system comprises transmission signal generating means for generating a transmission signal which is frequency-modulated by a modulating signal having a waveform including an ascending portion and a descending portion; transmitter-receiver means for transmitting the transmission signal as a radio wave and receiving the radio wave reflected back thereto so as to produce a received signal; mixing means for mixing the transmission signal and the received signal to produce a beat signal; beat frequency selecting means for selecting ascending-side and descending-side beat frequencies at regions of the beat signal corresponding to the ascending portion and the descending portion of the modulating signal; beat frequency predicting means for pairing the ascending-side and descending-side beat frequencies one by one from each side so as to provide first beat frequency combinations and predicting second beat frequency combinations indicative of the first beat frequency combinations after a given time based on the first beat frequency combinations, respectively, the ascending-side and descending-side beat frequencies representing a plurality of targets which reflect back the radio wave to the transmitter-receiver means; setting means for setting such second beat frequency combinations as correct beat frequency combinations, the second beat frequency combinations, set by the setting means, each having the ascending-side beat frequency and the descending-side beat frequency which fall in a given range of one of ascending-side beat frequencies and a given range of one of descending-side beat frequencies, respectively, of a beat signal selected by the beat frequency selecting means after the given time; and deriving means for deriving information about the corresponding targets based on the correct beat frequency combinations set by the setting means.

It may be arranged that the beat frequency predicting means predicts the second beat frequency combinations based on third beat frequency combinations which are selected from the first beat frequency combinations.

It may be arranged that the waveform of the modulating signal further includes a constant portion in addition to the ascending and descending portions, that the beat frequency predicting means derives first relative velocities of the targets based on constant-side beat frequencies at a region of the beat signal corresponding to the constant portion of the modulating signal, the beat frequency predicting means further deriving second relative velocities based on the first beat frequency combinations, that the beat frequency predicting means compares the second relative velocities with the first relative velocities, respectively, for selecting such second relative velocities each of which substantially matches one of the first relative velocities, and that the beat frequency predicting means derives the third beat frequency combinations from the second relative velocities selected by the beat frequency predicting means.

It may be arranged that the waveform of the modulating signal further includes a constant portion in addition to the ascending and descending portions, that the information about the corresponding targets includes first relative velocities of the targets, that the beat frequency predicting means further derives second relative velocities of the targets based on constant-side beat frequencies at a region of the beat signal corresponding to the constant portion of the modulating signal, and that the setting means compares the first relative velocities with the second relative velocities, respectively, for selecting such first relative velocities each substantially matching one of the second relative velocities as information of the corresponding targets.

According to another aspect of the present invention, an FM-CW radar system comprises transmission signal generating means for generating a transmission signal which is frequency-modulated by a modulating signal having a waveform including an ascending portion and a descending portion; transmitter-receiver means for transmitting the transmission signal as a radio wave and receiving the radio wave reflected back thereto so as to produce a received signal; mixing means for mixing the transmission signal and the received signal to produce a beat signal; beat frequency selecting means for selecting ascending-side and descending-side beat frequencies at regions of the beat signal corresponding to the ascending portion and the descending portion of the modulating signal; target information predicting means for pairing the ascending-side and descending-side beat frequencies one by one from each side so as to provide beat frequency combinations, the ascending-side and descending-side beat frequencies representing a plurality of targets which reflect back the radio wave to the transmitter-receiver means, the target information predicting means deriving first values, each representing one of a first relative velocity and a distance of the target, from the beat frequency combinations, the target information predicting means predicting second values indicative of the first values after a given time based on the first values, respectively; and setting means for setting such second values as correct values indicative of the corresponding targets, the second values, set by the setting means, each falling in a given range of one of the first values derived by the target information predicting means after the given time.

It may be arranged that each of the first values represents the first relative velocity, that the waveform of the modulating signal further includes a constant portion in addition to the ascending and descending portions, that the target information predicting means derives second relative velocities of the targets based on constant-side beat frequencies at a region of the beat signal corresponding to the constant portion of the modulating signal, and that the setting means compares the second values, set by the setting means, with the second relative velocities, respectively, for selecting such second values each substantially matching one of the second relative velocities as finally correct relative velocities of the corresponding targets.

According to another aspect of the present invention, an FM-CW radar system comprises transmission signal generating means for generating a transmission signal which is frequency-modulated by a modulating signal having a waveform including a constant portion, an ascending portion and a descending portion; transmitter-receiver means for transmitting the transmission signal as a radio wave and receiving the radio wave reflected back thereto so as to produce a received signal; mixing means for mixing the transmission signal and the received signal to produce a beat signal; beat frequency selecting means for selecting constant-side, ascending-side and descending-side beat frequencies at regions of the beat signal corresponding to the constant portion, the ascending portion and the descending portion of the modulating signal; first deriving means for deriving a first relative velocity from each of the constant-side beat frequencies, the constant-side, ascending-side and descending-side beat frequencies representing a plurality of targets which reflect back the radio wave to the transmitter-receiver means; second deriving means for pairing the ascending-side and descending-side beat frequencies one by one from each side so as to provide beat frequency combinations and deriving a second relative velocity from each of the beat frequency combinations; and setting means for setting such second relative velocities as correct relative velocities indicative of the corresponding targets, the second relative velocities, set by the setting means, each substantially matching one of the first relative velocities.

It may be arranged that third deriving means is further provided for deriving a third relative velocity from each of the second relative velocities set by the setting means, the third relative velocities indicative of the corresponding second relative velocities after a given time, respectively, and that the setting means sets such third relative velocities as finally correct relative velocities, the third relative velocities, set by the setting means, each falling in a given range of one of the second relative velocities set by the setting means after the given time.

According to another aspect of the present invention, an FM-CW radar system comprises transmission signal generating means for generating a transmission signal which is frequency-modulated by a modulating signal having a waveform including a constant portion, an ascending portion and a descending portion; transmitter-receiver means for transmitting the transmission signal as a radio wave and receiving the radio wave reflected back thereto so as to produce a received signal; mixing means for mixing the transmission signal and the received signal to produce a beat signal; beat frequency selecting means for selecting constant-side, ascending-side and descending-side beat frequencies at regions of the beat signal corresponding to the constant portion, the ascending portion and the descending portion of the modulating signal; first deriving means for deriving a first relative velocity from each of the constant-side beat frequencies, the constant-side, ascending-side and descending-side beat frequencies representing a plurality of targets which reflect back the radio wave to the transmitter-receiver means; second deriving means for pairing the ascending-side and descending-side beat frequencies one by one from each side so as to provide-beat frequency combinations and deriving a second relative velocity from each of the beat frequency combinations; first setting means for setting as first beat frequency combinations such beat frequency combinations each of which renders the corresponding second relative velocity derived by the second deriving means substantially match one of the first relative velocities; beat frequency predicting means for predicting second beat frequency combinations indicative of the first beat frequency combinations after a given time based on the first beat frequency combinations, respectively; second setting means for setting such second beat frequency combinations as third beat frequency combinations, the second beat frequency combinations, set by the second setting means, each having the ascending-side beat frequency and the descending-side beat frequency which fall in a given range of one of ascending-side beat frequencies and a given rage of one of descending-side beat frequencies, respectively, of the first beat frequency combinations set by the first setting means after the given time; and deriving means for deriving information about the corresponding targets based on the third beat frequency combinations set by the second setting means.

According to another aspect of the present invention, an FM-CW radar system comprises transmission signal generating means for generating a transmission signal which is frequency-modulated by a modulating signal having a waveform including a constant portion, an ascending portion and a descending portion; transmitter-receiver means for transmitting the transmission signal as a radio wave and receiving the radio wave reflected back thereto so as to produce a received signal; mixing means for mixing the transmission signal and the received signal to produce a beat signal; beat frequency selecting means for selecting constant-side, ascending-side and descending-side beat frequencies at regions of the beat signal corresponding to the constant portion, the ascending portion and the descending portion of the modulating signal; beat frequency predicting means for pairing the ascending-side and descending-side beat frequencies one by one from each side so as to provide first beat frequency combinations and predicting second beat frequency combinations indicative of the first beat frequency combinations after a given time based on the first beat frequency combinations, respectively, the constant-side, ascending-side and descending-side beat frequencies representing a plurality of targets which reflect back the radio wave to the transmitter-receiver means; first setting means for setting such second beat frequency combinations as third beat frequency combinations, the second beat frequency combinations, set by the first setting means, each having the ascending-side beat frequency and the descending-side beat frequency which fall in a given range of one of ascending-side beat frequencies and a given range of one of descending-side beat frequencies, respectively, of a beat signal selected by the beat frequency selecting means after the given time; first deriving means for deriving a first relative velocity from each of the constant-side beat frequencies; second deriving means for deriving a second relative velocity from each of the third beat frequency combinations; and second setting means for setting as correct relative velocities such second relative velocities each of which substantially matches one of the first relative velocities.

BRIEF DESCRIPTION OF THE DRAWINGS

The present invention will be understood more fully from the detailed description given hereinbelow, taken in conjunction with the accompanying drawings.

In the drawings:

FIGS. 20 and 21 show a flowchart of a calculation routine to be executed by a microcomputer for deriving relative velocities and distances of a plurality of targets with respect to a signal transmitter according to a fifth preferred embodiment of the present invention; and FIGS. 22 to 24 show a flowchart of a calculation routine to be executed by a microcomputer for deriving relative velocities and distances of a plurality of targets with respect to a signal transmitter according to a sixth preferred embodiment of the present invention.

DESCRIPTION OF THE PREFERRED EMBODIMENT

Figure 1:
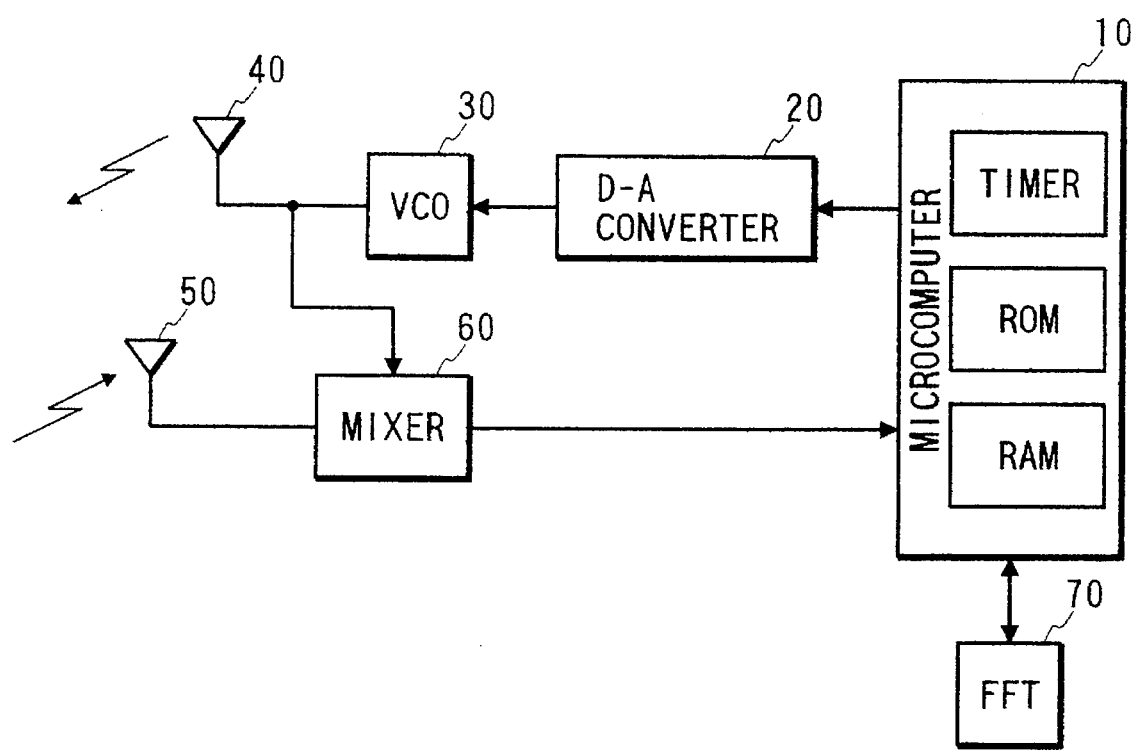
FIG. 1 is a block diagram showing a structure of an FM-CW radar system for a vehicle according to a first preferred embodiment of the present invention.

Prior to description of preferred embodiments, conceptions thereof will be described for facilitating understanding of the present invention.

Conception 1

According to the foregoing equations (1) and (2), a distance and a relative velocity of each of a plurality of targets can be derived concurrently if an ascending-side beat frequency and a descending-side beat frequency of a beat signal are correctly selected for each target.

Thus, as long as each target makes a uniform motion, a distance $Dt$ and a relative velocity $Vt$ of each target after a given time $\Delta T$ can also be derived concurrently from equations (3) and (4) as follows:

$$Dt = D + V \cdot \Delta \quad (3)$$

$$Vt = V \quad (4)$$

wherein D and V represent left sides of the foregoing equations (1) and (2), respectively.

Accordingly, the foregoing conventional problem can be overcome in the following manner:

Assuming that four targets are present, the frequency-spectral analysis of the beat signal reveals four ascending-side beat frequencies and four descending-side beat frequencies. By arbitrarily selecting and pairing the ascending-side beat frequencies and the descending-side beat frequencies one by one from each side, four combinations of the ascending-side and descending-side beat frequencies are prepared assuming that the four beat frequency combinations correspond to the four targets, respectively.

By substituting each of the beat frequency combinations into the equations (1) and (2), a distance D and a relative velocity V of the corresponding target can be derived. Further, based on the derived distance D and relative velocity V, a distance Dt and a relative velocity Vt of each target after ΔT can be derived using the equations (3) and (4).

By substituting the derived distance Dt and relative velocity Vt for D and V of the equations (1) and (2), ascending and descending beat frequencies after ΔT can be derived by solving the simultaneous equations (1) and (2). In other words, a current beat frequency combination can be predicted based on the beat frequency combination assumed ΔT before.

On the other hand, whether or not the predicted beat frequency combination is correct can be judged based on whether or not the ascending beat frequency and the descending beat frequency of the predicted beat frequency combination are found in ascending beat frequencies and descending beat frequencies, respectively, derived after ΔT by frequency-analyzing an actually received beat signal, or in the neighborhood thereof. Specifically, it can be determined that the predicted beat frequency combination having the found or existing ascending and descending beat frequencies is correct. Accordingly, a distance D and a relative velocity V of each of the targets can be derived based on the correct beat frequency combination among the beat frequency combinations predicted ΔT before.

It may also be arranged that the foregoing determination about correctness of the predicted beat frequency combination is achieved based on whether the foregoing distance Dt and relative velocity Vt are found in distances D and relative velocities V, respectively, derived based on all possible beat frequency combinations of ascending-side beat frequencies and descending-side beat frequencies derived after ΔT by frequency-analyzing an actually received beat signal, or in the neighborhood thereof.

Conception 2

It is assumed that a beat signal contains CW (continuous wave) Doppler frequency components and FM-CW Doppler frequency components. Since it can be considered that a frequency modulation width ΔF in the equation (1) is 0 (zero) relative to the CW Doppler frequency components, distances of targets can not be known from the CW Doppler frequency components. On the other hand, a relative velocity of each target can be derived based on the CW Doppler frequency component, using an equation (5) as follows:

$$Vd = \{C/(2f0)\} \cdot (fd) \quad (5)$$

wherein Vd represents the relative velocity and fd represents a beat frequency indicative of the CW Doppler frequency components.

Figure 9:
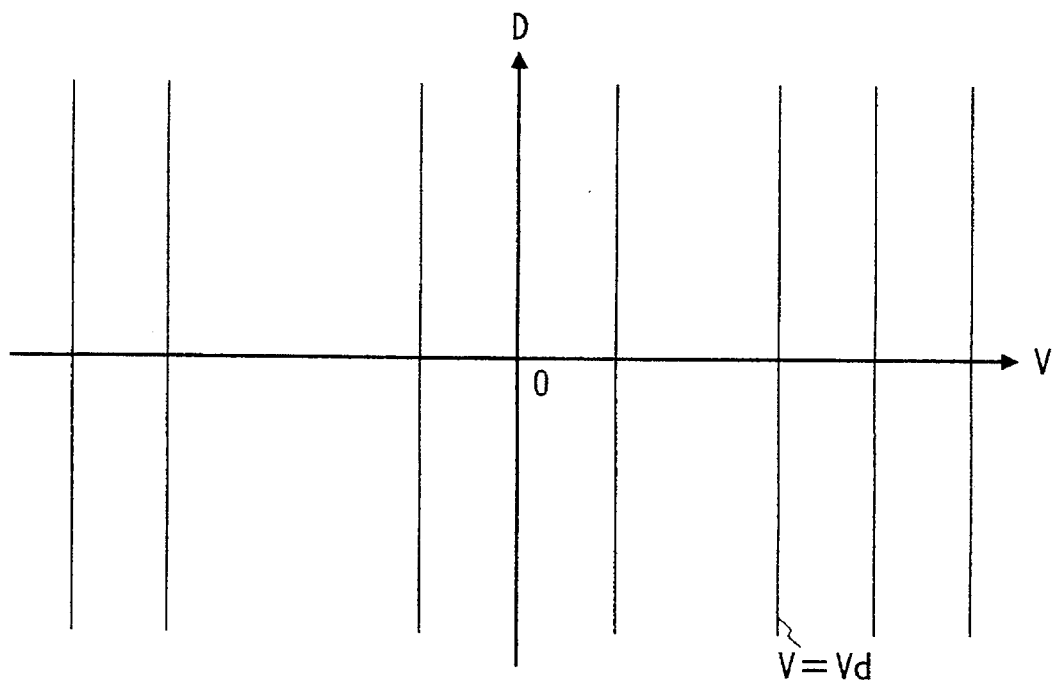
FIG. 9 is a diagram showing relative velocities of seven targets on an orthogonal coordinate plane which are derived based on CW Doppler frequency components.

Accordingly, as shown in FIG. 9, if a relative velocity of each target derived from the equation (5) is plotted on an orthogonal coordinate plane having an X-axis defining relative velocities V and a Y-axis defining distances D, a distance D of each target, even unknown, falls on a straight line (parallel to the Y-axis) defined by a relative velocity V=Vd of the corresponding target.

On the other hand, since the frequency modulation width ΔF is effective in the FM-CW Doppler frequency components, a distance D and a relative velocity V of each target can be derived from the equations (1) and (2) based on an ascending-side beat frequency and a descending-side beat frequency. Assuming that the number of targets is four, the frequency-spectral analysis of the beat signal reveals four ascending-side beat frequencies and four descending-side beat frequencies. Accordingly, the number of all possible combinations of the ascending-side and descending-side beat frequencies is 16. Thus, 16 coordinate points (V, D) can be plotted on the orthogonal coordinate plane relative to the four targets based on the derived distances D and relative velocities V (see FIG. 10).

Since the relative velocities should be equal to each other both in the CW Doppler frequency component and the FM-CW Doppler frequency components for each of the targets, those coordinate points (V, D) which substantially fall on the respective straight lines identified by V=Vd are determined as being derived based on the correct combinations of the ascending-side beat frequencies and the descending-side beat frequencies.

Accordingly, by arranging the modulating signal to have a waveform per cycle which causes the beat signal to contain the CW Doppler frequency components and the FM-CW Doppler frequency components, a correct combination of an ascending-side beat frequency and a descending-side beat frequency can be achieved for each of a plurality of targets at one cycle of the modulating signal.

Now, preferred embodiments of the present invention will be described hereinbelow with reference to the accompanying drawings.

First Embodiment

FIG. 1 shows an FM-CW radar system for a vehicle according to a first preferred embodiment of the present invention.

Figure 2:
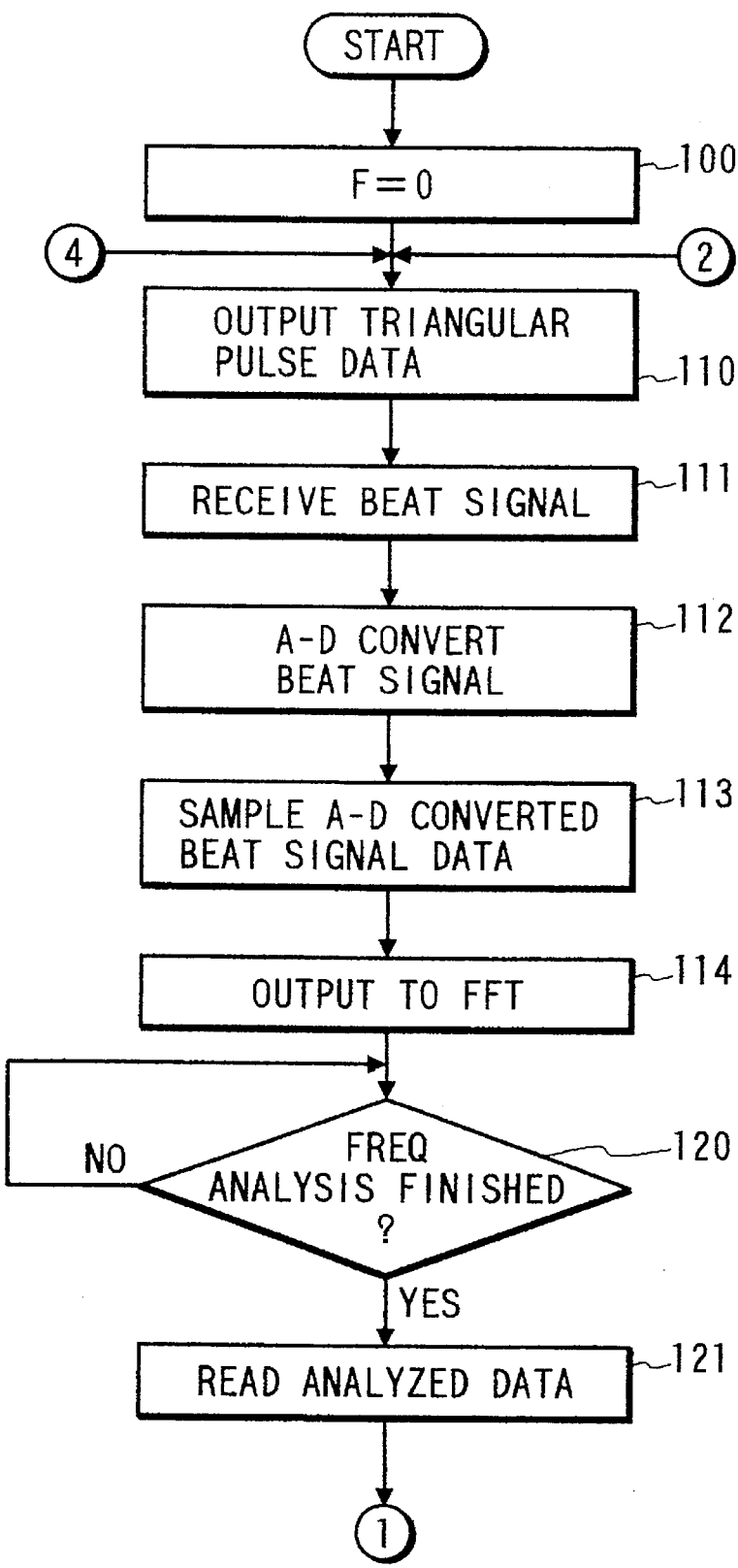
FIGS. 2 to 4 show a flowchart of a calculation routine to be executed by a microcomputer for deriving relative velocities and distances of a plurality of targets with respect to a signal transmitter according to the first preferred embodiment.
Figure 3:
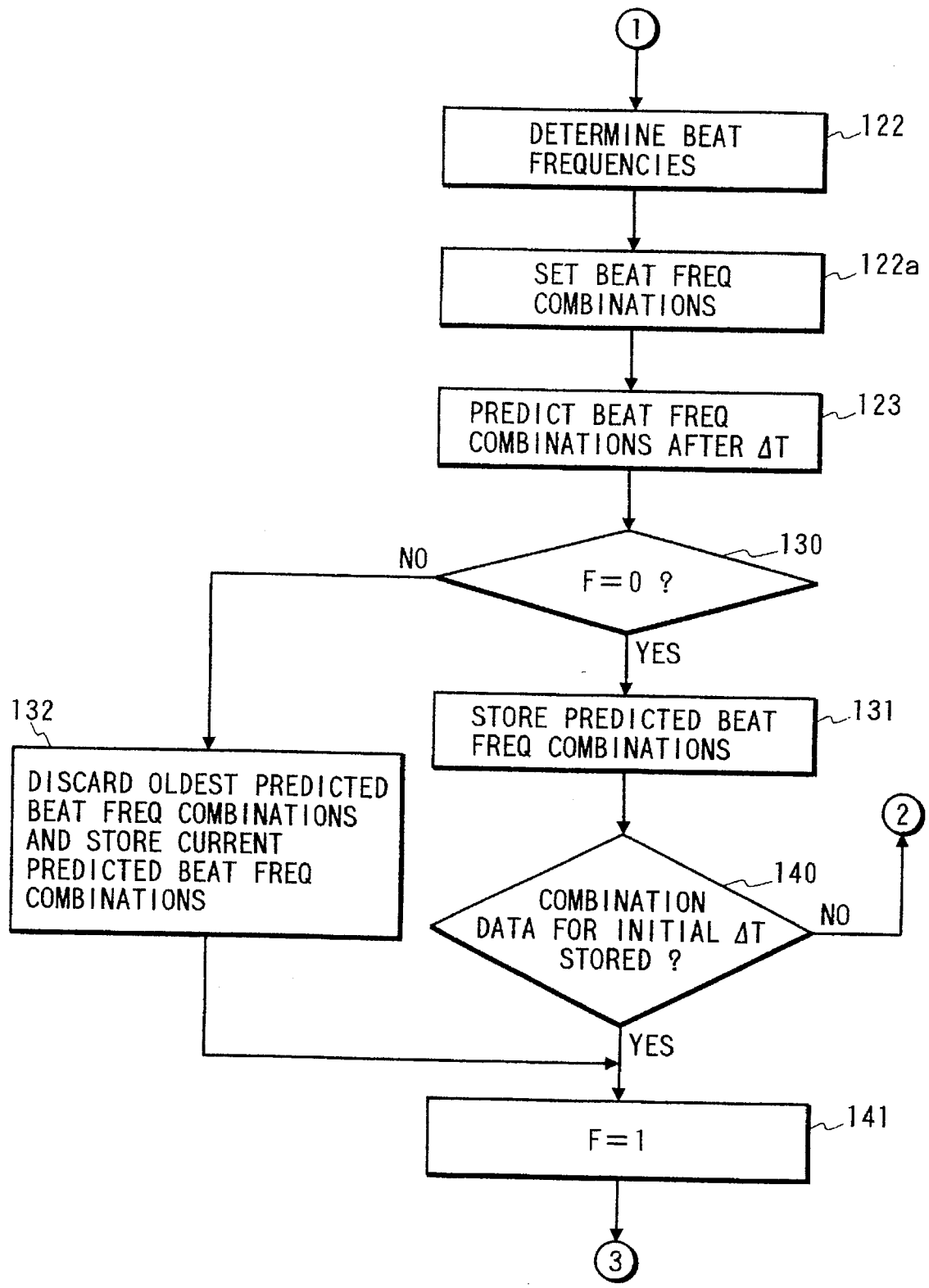
Figure 4:
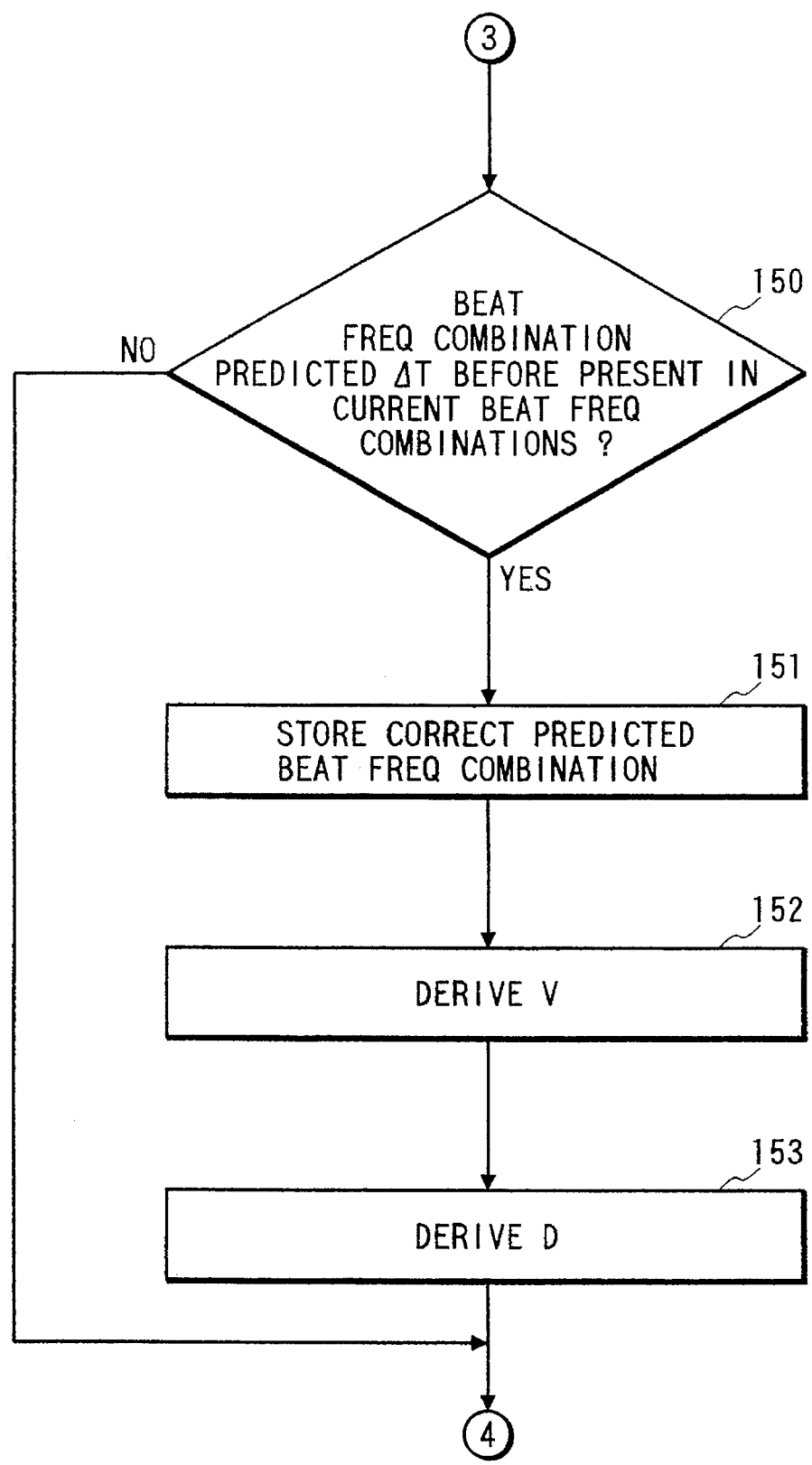

In FIG. 1, the FM-CW radar system includes a microcomputer 10 which executes a program as represented by a flowchart shown in FIGS. 2 to 4. The program is stored In a ROM (read only memory) of the microcomputer 10 in advance. A D-A (digital-to-analog) converter 20 converts triangular pulse data from the microcomputer 10 into an analog modulating signal. A VCO (voltage-controlled oscillator) 30 produces a frequency-modulated transmission signal in response to the modulating signal from the D-A converter 20. A transmitting antenna 40 sends out the transmission signal from the VCO 30 in the form of a radio wave in a forward direction of the vehicle. In this preferred embodiment, the radio wave has a center frequency of 77 GHz with a frequency modulation width of 75 MHz, which, however, is selectable.

A receiving antenna 50 receives the radio wave reflected by a target or targets and outputs a received signal to a mixer 60. The mixer 60 mixes or combines the transmission signal from the VCO 30 and the received signal from the receiving antenna 50 to form a beat signal for an output to the microcomputer 10.

A frequency analyzer (hereinafter referred to as "FFT") 70 performs a frequency-spectral analysis of output data from the microcomputer 10 using the fast Fourier transform technique and outputs a result of the analysis as frequency-spectral data to the microcomputer 10.

When set in operation, the FM-CW radar system having the foregoing structure starts executing the program of a calculation routine according to the flowchart shown in FIGS. 2 to 4.

First at step 100, a flag F is reset to 0 (F=0). Subsequently, at step 110, triangular pulse data prestored in the ROM of the microcomputer 10 is outputted as a digital output signal to the D-A converter 20 per given timing (for example, per 100 ms). This timing is repeatedly measured by a timer incorporated in the microcomputer 10. In response to the digital signal from the microcomputer 10, the D-A converter 20 converts it into an analog modulating signal for an output to the VCO 30. In response to the modulating signal from the D-A converter 20, the VCO 30 produces a frequency-modulated transmission signal which is modulated in frequency depending on a voltage level of the modulating signal. The frequency-modulated transmission signal is fed to the transmitting antenna 40 so as to be sent out as a radio wave in the forward direction of the vehicle.

Upon receipt of the radio wave reflected by a target or targets (four targets in this preferred embodiment), such as other vehicles, through the receiving antenna 50, the mixer 60 mixes or combines the received signal with the transmission signal from the VCO 30 so as to produce a beat signal.

When the microcomputer 10 receives the beat signal from the mixer 60 at step 111, the received beat signal is A-D (analog-to-digital) converted at step 112. The A-D converted data is then sampled at step 113.

Subsequently, at step 114, the sampled data is outputted to the FFT 70 where the frequency-spectral analysis of the sampled data is performed. The routine then proceeds to step 120 which checks whether the frequency analysis of the sampled data is finished. When the frequency analysis at the FFT 70 is finished, step 120 produces positive answer so that the microcomputer 10 inputs the frequency-analyzed data of the beat signal from the FFT 70.

Thereafter, at step 122, peak values of the beat signal at regions corresponding to ascending and descending portions of the modulating signal are searched and specified based on the frequency-analyzed data. Since the four targets are assumed in this preferred embodiment, four peak values are identified at each of the foregoing regions of the beat signal, that is, four ascending-side beat frequencies and four descending-side beat frequencies are determined based on the searched peak values.

The routine then proceeds to step 122a where the ascending-side beat frequencies and the descending-side beat frequencies determined at step 122 are paired one by one from each side so as to provide sixteen combinations thereof. Subsequently, at step 123, where a predicted beat frequency combination of ascending-side and descending-side beat frequencies after a given time ΔT is derived for each of the beat frequency combinations set at step 122a, using the foregoing equations (1) to (4). The given time ΔT is set to be five times a period of the digital signal from the microcomputer 10 to the D-A converter 20, that is, 500 ms.

Specifically, when ascending-side and descending-side beat frequencies of one of the combinations determined at step 122 are given by fb1 and fb2, respectively, a distance D and a relative velocity V are derived from the equations (1) and (2), respectively. Further, a distance Dt after ΔT is derived from the equation (3) using the derived distance D and relative velocity V. Then, it is assumed that predicted ascending-side and descending-side beat frequencies of a predicted beat frequency combination after ΔT are given by fb1t and fb2t, respectively. By substituting fb1t and fb2t, as unknowns, for fb1 and fb2 in the equations (1) and (2) and Dt for D in the equation (1) and solving the simultaneous equations (1) and (2), the predicted ascending-side beat frequency fb1t and the predicted descending-side beat frequency fb2t can be derived.

At step 123, predicted beat frequency combinations for the other beat frequency combinations set at step 122a are also derived in the same manner, respectively.

Subsequently, the routine proceeds to step 130 which checks whether F=0. Since F=0 at this time, step 130 yields positive answer so that the routine proceeds to step 131 where the predicted beat frequency combinations derived at step 123 are stored in a RAM (random-access memory) of the microcomputer 10.

Thereafter, step 140 checks whether the combination data, that is, the predicted beat frequency combinations, for the initial given time ΔT are stored. After negative answer at step 140, steps 110 to 131 are repeated in the foregoing manner until step 140 yields positive answer. When the combination data corresponding to the initial given time ΔT is stored in the RAM, step 140 produces positive answer so that the routine proceeds to step 141 where the flag F is set to 1 (F=1).

Subsequently, at step 150, the predicted beat frequency combinations which were predicted at step 123 ΔT before are compared with the current beat frequency combinations set at step 122a one by one. If the compared predicted beat frequency combination falls within a given range of one of the current beat frequency combination, step 150 yields positive answer so that the routine proceeds to step 151. Specifically, if ascending-side and descending-side beat frequencies of the compared predicted beat frequency combination coincide with those of one of the current beat frequency combinations, respectively, or fall in the neighborhood of them, respectively, step 150 yields positive answer meaning that the compared predicted beat frequency combination is correct. In this preferred embodiment, the neighborhood represents an allowable error rage.

At step 151, the compared predicted beat frequency combination determined to be correct at step 150 is stored in the RAM as a correct beat frequency combination. Subsequently, based on the correct beat frequency combination stored in the RAM at step 151, a relative velocity V of the corresponding target is derived from the equation (2) at step 152, and then, a distance D of the corresponding target is derived from the equation (1) at step 153. As appreciated, the foregoing steps 150 to 153 are repeatedly executed until step 150 produces negative answer meaning that no further predicted beat frequency combination which satisfies the foregoing condition for positive answer at step 150 is present.

When step 150 produces negative answer, steps 110 through 123 are executed as in the foregoing manner. On the other hand, since F=1 at this time, step 130 yields negative answer so that the routine proceeds to step 132 where the oldest predicted beat frequency combinations stored in the RAM are discarded and the current predicated beat frequency combinations predicted at step 123 are newly stored in the RAM. Subsequently, steps 141 through 153 are executed as in the foregoing manner, and thereafter, steps 110 through 153 are repeatedly executed, bypassing steps 131 and 140, so as to successively derive the relative velocities V and the distances D of the respective targets.

In the manner as described above, even if a plurality of targets have relative velocities with respect to the signal transmitter, the relative velocities and the distances of the plurality of targets can be correctly derived.

In the foregoing first preferred embodiment, an appropriate evaluation function, for example, for removing such a peak value of the beat signal having abnormally large differences relative to other peak values may be set so as to eliminate noise and the like before the execution of step 122. With this arrangement, the number of beat frequencies determined at step 122 is lowered so that the processing volume at steps 122a and 123 can be reduced.

Further, in the foregoing first preferred embodiment, it 1s arranged that the microcomputer 10 outputs the triangular pulse data to the D-A converter 20. However, any waveform data may be used as long as the waveform data contains an ascending portion and a descending portion. Accordingly, it is also possible that the waveform data has an ascending portion subsequent to a descending portion.

Second Embodiment

Figure 5:
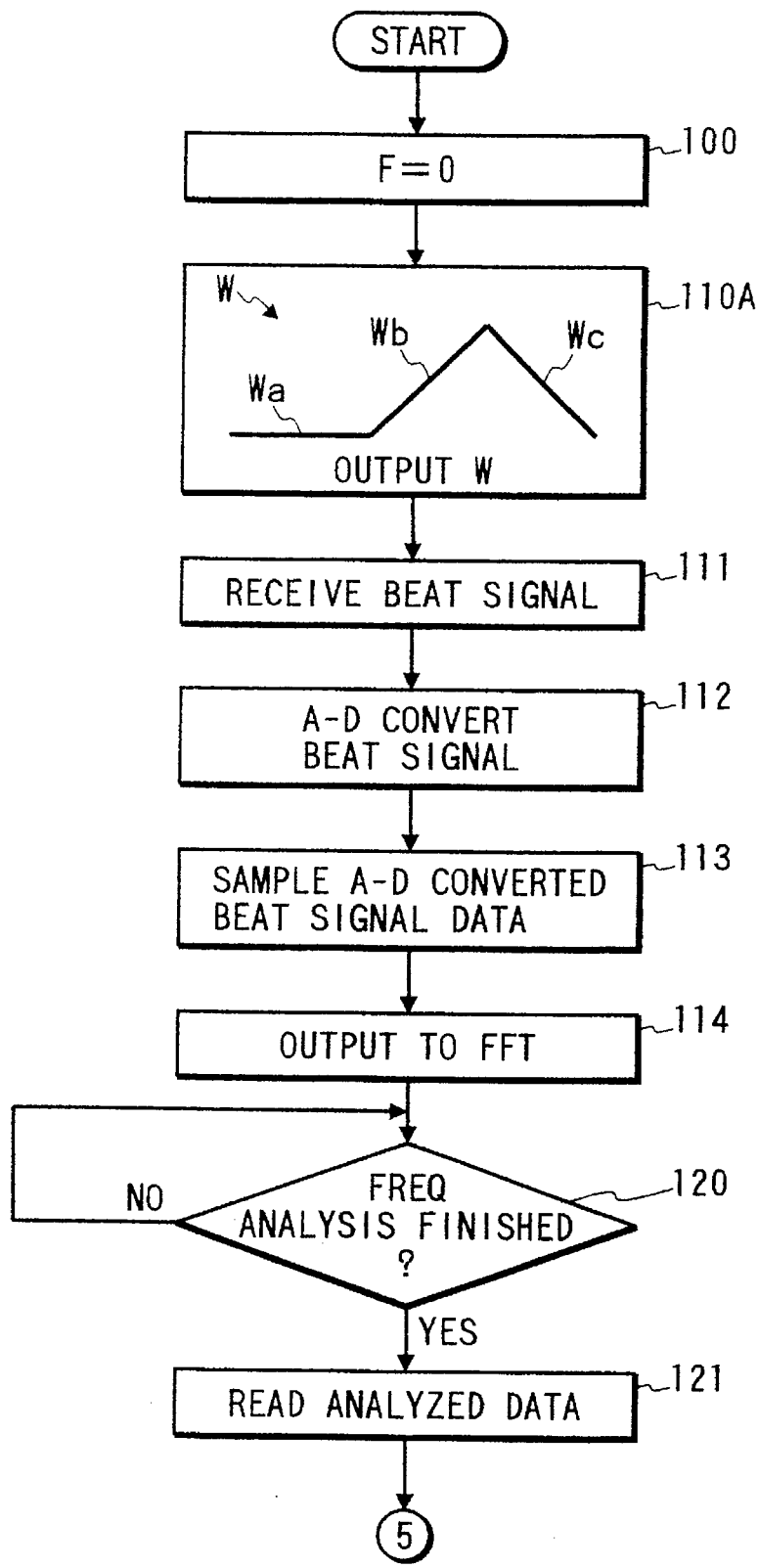
FIGS. 5 and 6 show a flowchart of a calculation routine to be executed by a microcomputer for deriving relative velocities and distances of a plurality of targets with respect to a signal transmitter according to a second preferred embodiment of the present invention.
Figure 6:
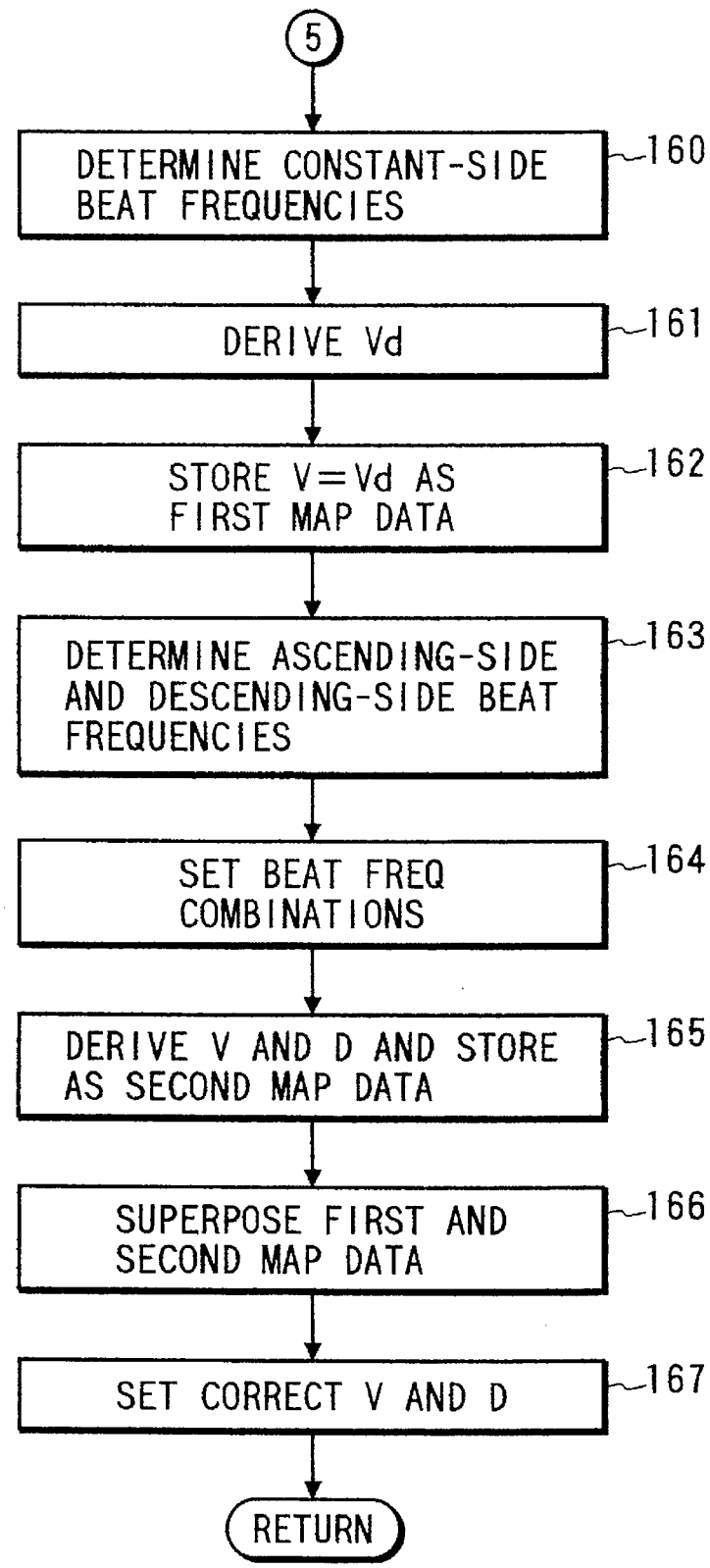

Now, a second preferred embodiment of the present invention will be described hereinbelow. In the second preferred embodiment, the microcomputer 10 executes a program of a calculation routine as represented by a flowchart shown in FIGS. 5 and 6 instead of the flowchart shown in FIGS. 2 to 4 executed in the foregoing first preferred embodiment. In the flowchart of the second preferred embodiment, steps which are the same in operation as those in the flowchart of the first preferred embodiment are assigned the same step signs. The program is prestored in the ROM of the microcomputer 10. The other structure is the same as in the first preferred embodiment.

First at step 100, a flag F is reset to 0 (F=0). Then, at step 110A, waveform data shown at step 110A and prestored in the ROM of the microcomputer 10 is outputted to the D-A converter 20 per given timing. This timing is repeatedly measured by the timer incorporated in the microcomputer 10. The waveform data W has a constant portion Wa, an ascending portion Wb and a descending portion Wc. Accordingly, in this preferred embodiment, a modulating signal produced by the D-A converter 20 is determined by the waveform data W instead of the triangular pulse data used in the foregoing first preferred embodiment. In response to this modulating signal from the D-A converter 20, the VCO 30 produces a frequency-modulated transmission signal. The frequency-modulated transmission signal is fed to the transmitting antenna 40 so as to be sent out as a radio wave in the forward direction of the vehicle.

Upon receipt of the radio wave reflected by a target or targets (seven targets in this preferred embodiment) through the receiving antenna 50, the mixer 60 mixes or combines the received signal with the transmission signal from the VCO 30 so as to produce a beat signal. The beat signal thus produced includes CW Doppler frequency components, FW-CW ascending-side Doppler frequency components and FM-CW descending-side Doppler frequency components at regions corresponding to the constant portion Wa, the ascending portion Wb and the descending portion Wc of the waveform data W, respectively.

Subsequently, through steps 111 to 114, the beat signal is A-D converted and sampled, and then outputted to the FFT 70. Upon completion of the frequency-spectral analysis of the sampled data by the FFT 70 as determined at step 120, the microcomputer 10 inputs the frequency-analyzed data of the beat signal from the FFT 70 at step 121.

Thereafter, at step 160, peak values of the beat signal at the CW Doppler frequency component data region as many as the number of the targets (seven) are searched and specified based on the frequency-analyzed data, and determined as constant-side beat frequencies, respectively. Then, at step 161, relative velocities Vd of the seven targets are derived from the equation (5) based on the constant-side beat frequencies as determined at step 160, respectively. FIG. 9 shows the derived seven relative velocities V=Vd on an orthogonal coordinate plane. As described before, a distance of each target from the signal transmitter is unknown. Subsequently, at step 162, the relative velocities Vd derived at step 161 are stored in the RAM as first map data on the orthogonal coordinate plane.

The routine then proceeds to step 163 where peak values of the beat signal at the FM-CW ascending-side Doppler frequency component data region as many as the number of the targets (seven) are searched and specified based on the frequency-analyzed data, and determined as ascending-side beat frequencies, respectively. Similarly, peak values of the beat signal at the FM-CW descending-side Doppler frequency component data region as many as the number of the targets (seven) are searched and specified based on the frequency-analyzed data, and determined as descending-side beat frequencies, respectively. Then, at step 164, the ascending-side beat frequencies and the descending-side beat frequencies determined at step 163 are paired one by one from each side so as to provide 49 combinations thereof.

Figure 10:
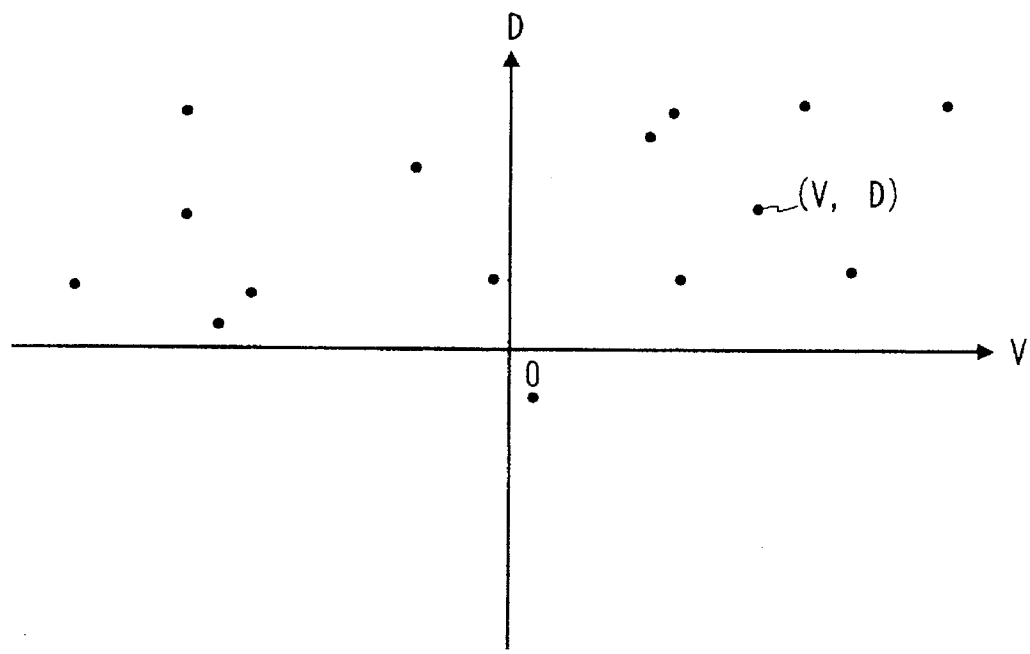
FIG. 10 is a diagram showing coordinate points on the orthogonal coordinate plane which are defined by relative velocities and distances, respectively, derived based on FM-CW Doppler frequency components.
Figure 11:
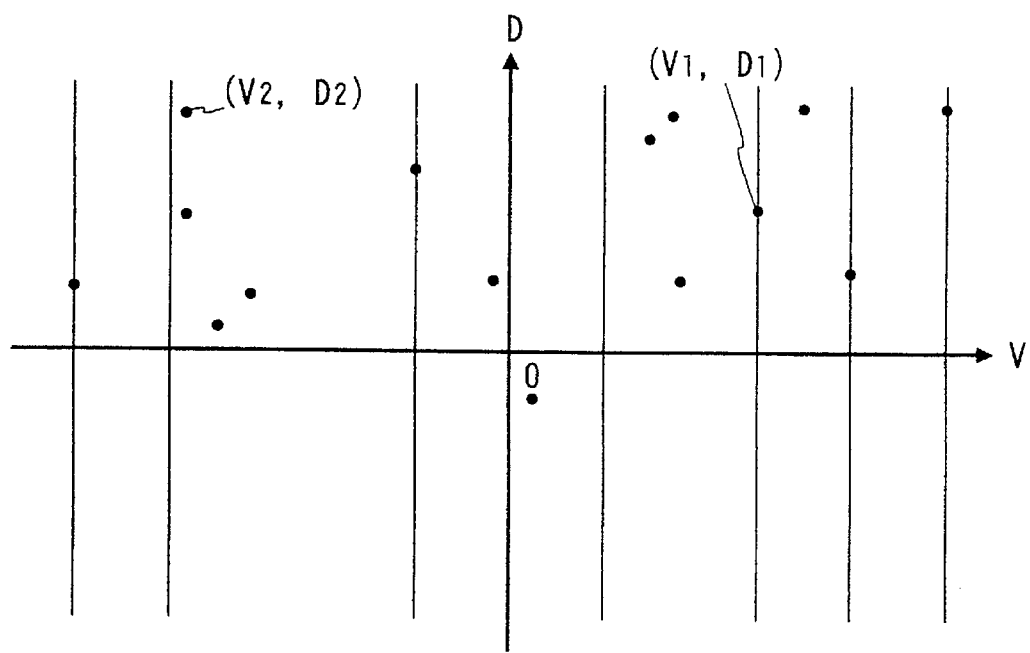
FIG. 11 is a diagram showing a relationship between the relative velocities defined by the CW Doppler frequency components and the coordinate points defined by the FM-CW Doppler frequency components, by superposing FIGS. 9 and 10.
Figure 12:
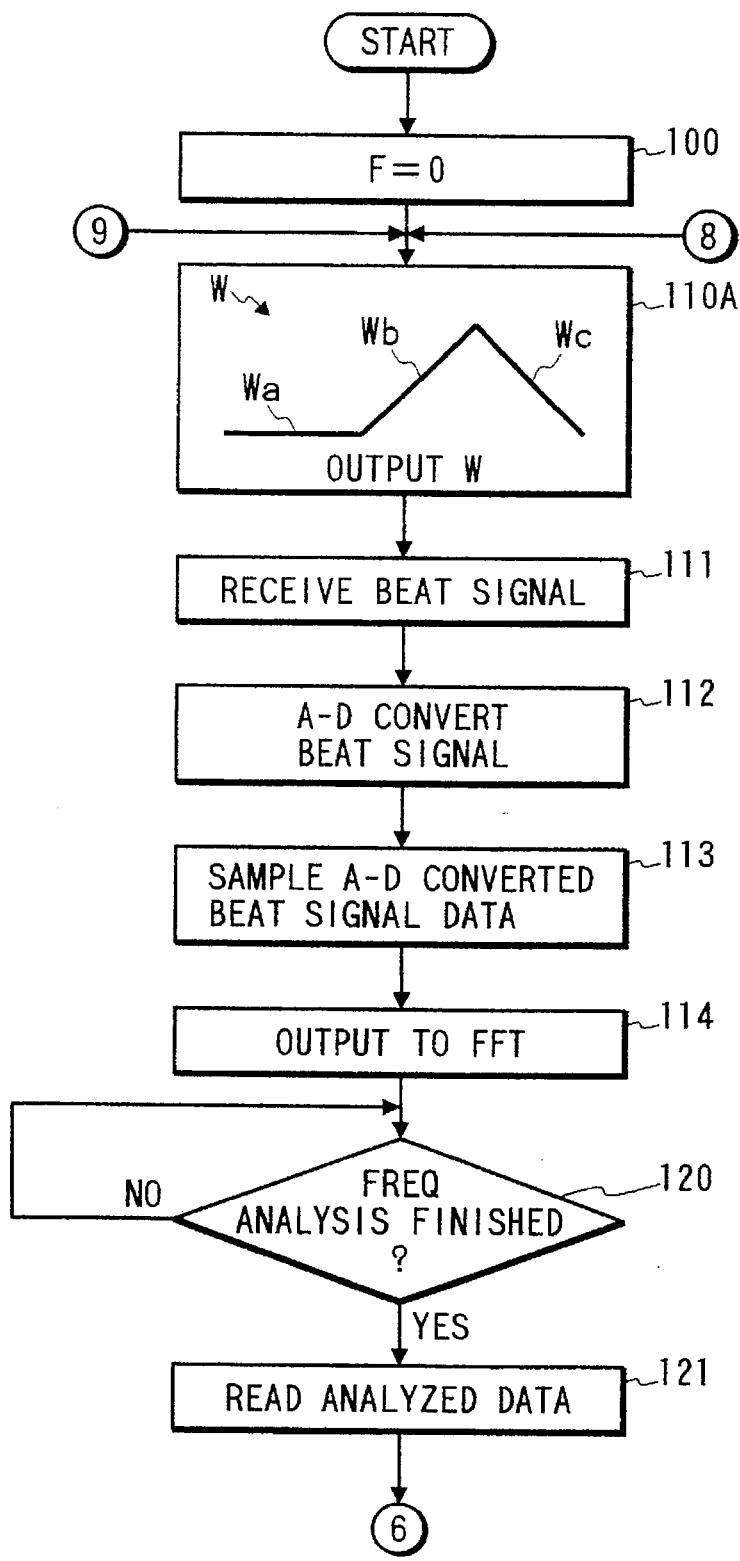
FIGS. 12 to 15 show a flowchart of a calculation routine to be executed by a microcomputer for deriving relative velocities and distances of a plurality of targets with respect to a signal transmitter according to a third preferred embodiment of the present invention.

Subsequently, at step 165, relative velocities V and distances D of the targets are derived from the equations (1) and (2) using the 49 beat frequency combinations set at step 164, and stored in the RAM as second map data representing coordinate points (V, D) on the orthogonal coordinate plane as shown in FIG. 10. Then, at step 166, the foregoing first and second map data are superposed on the orthogonal coordinate plane. As appreciated, coordinate points (V, D) substantially falling on straight lines (V=Vd), respectively, are determined as being derived from correct beat frequency combinations among those set at step 164. For example, in FIG. 11, a coordinate point (V1, D1) is derived from a correct beat frequency combination, while a coordinate point (V2, D2) is derived from a wrong beat frequency combination.

Accordingly, at step 167, the relative velocities V and distances D of the targets corresponding to the coordinate points (V, D) substantially falling on the straight lines (V=Vd) are set as correct relative velocities V and correct distances D.

With the foregoing arrangement, in the second preferred embodiment, the correct relative velocities and distances for the respective targets can be determined at one cycle of the modulating signal.

In the second preferred embodiment, it may be arranged that only the relative velocities V are derived and stored at step 165 as the second map data, that the correct relative velocities V are selected by superposing the first and second map data and set at step 167, and that the correct distances D are derived based on the beat frequency combinations corresponding to the correct relative velocities V set at step 167. This arrangement can reduce the calculation volume.

Figure 7:
FIG. 7 is a diagram showing waveform data for producing a modulating signal according to a modification of the second preferred embodiment.
Figure 8:
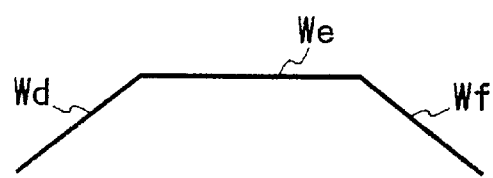
FIG. 8 is a diagram showing waveform data for producing a modulating signal according to another modification of the second preferred embodiment.

Further, in the foregoing second preferred embodiment, it is arranged that the microcomputer 10 outputs the waveform data W shown at step 110A to the D-A converter 20. Instead of this, as shown in FIG. 7, waveform data may have a constant portion Wa after an ascending portion Wb and a descending portion Wc. Alternatively, as shown in FIG. 8, waveform data may have an ascending portion Wd, a constant portion Wc and a descending portion Wf in the order named.

Third Embodiment

Now, a third preferred embodiment of the present invention will be described hereinbelow. In the third preferred embodiment, the microcomputer 10 executes a program of a calculation routine as represented by a flowchart shown in FIGS. 12 to 15 which is a combination of the flowcharts executed in the foregoing first and second preferred embodiments. In the flowchart of the third preferred embodiment, steps which are the same in operation as those in the flowcharts of the first and second preferred embodiments are assigned the same step signs. The program is prestored in the ROM of the microcomputer 10. The other structure is the same as in the second preferred embodiment.

Figure 15:
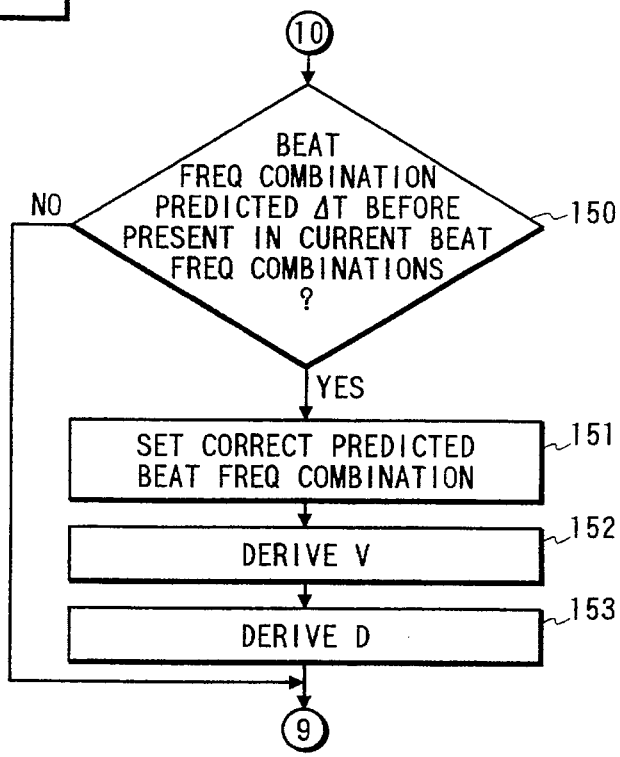
Figure 16:
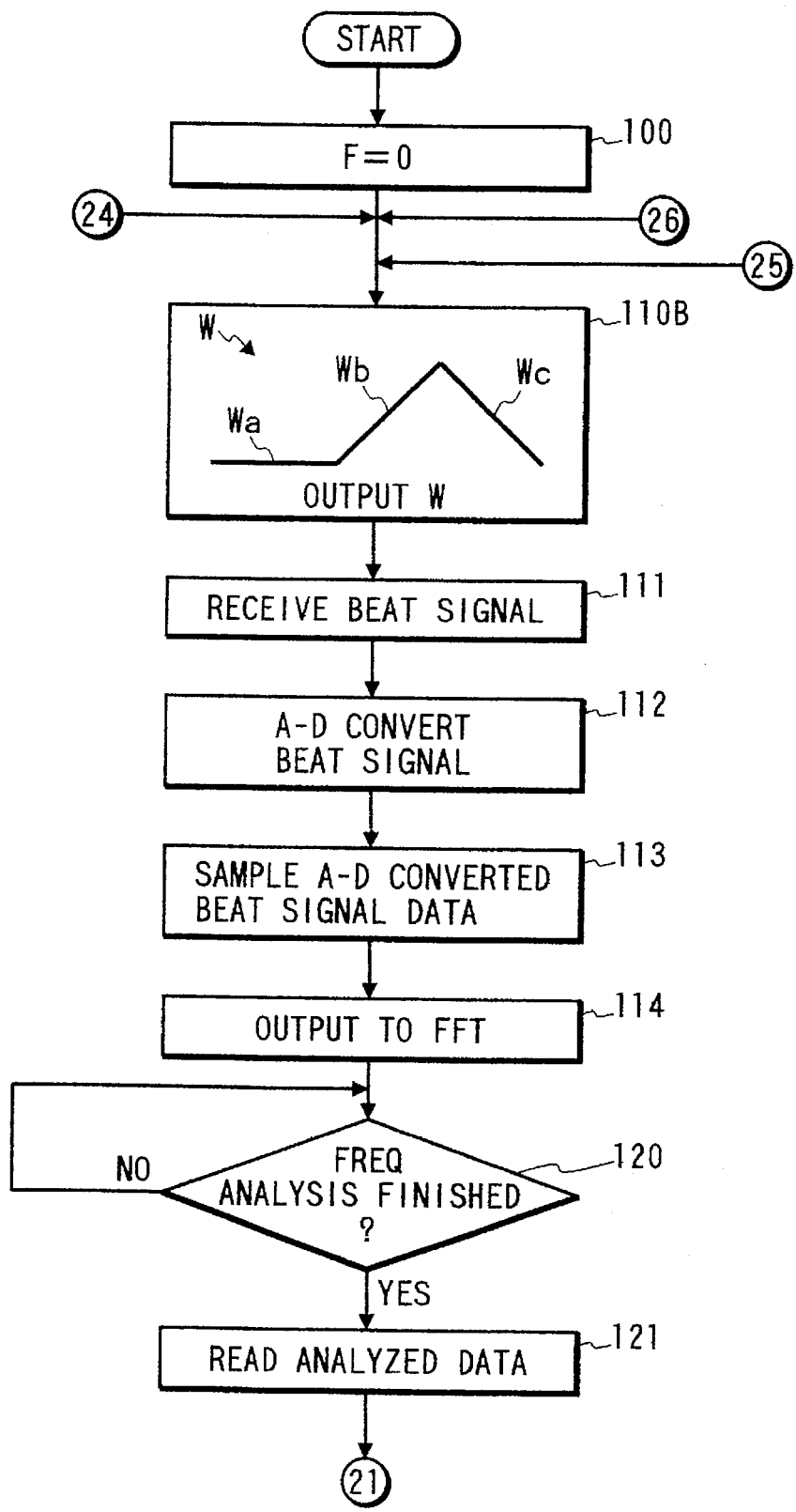
FIGS. 16 to 19 show a flowchart of a calculation routine to be executed by a microcomputer for deriving relative velocities and distances of a plurality of targets with respect to a signal transmitter according to a fourth preferred embodiment of the present invention.

In the third preferred embodiment, as in the second preferred embodiment, steps 100 to 121 (see FIGS. 5 and 12) and steps 160 to 167 (see FIGS. 6 and 13) are executed. Although step 167 in FIG. 6 sets the correct relative velocities V and correct distances D, step 167 in FIG. 13 sets the beat frequency combinations corresponding to the coordinate points (V, D) substantially falling on the straight lines (V=Vd) are set as correct beat frequency combinations. Thereafter, as in the first preferred embodiment, steps 123 to 141 (see FIGS. 3 and 14) and steps 150 to 153 (see FIGS. 4 and 15) are executed. As appreciated, step 123 in FIG. 14 predicts the beat frequency combinations after ΔT for the beat frequency combinations set at step 167 in FIG. 13, using the foregoing equations (1) to (4). Further, step 150 in FIG. 15 compares the predicted beat frequency combinations which were predicted at step 123 ΔT before with the current beat frequency combinations set at step 167 in FIG. 13 one by one.

Figure 13:
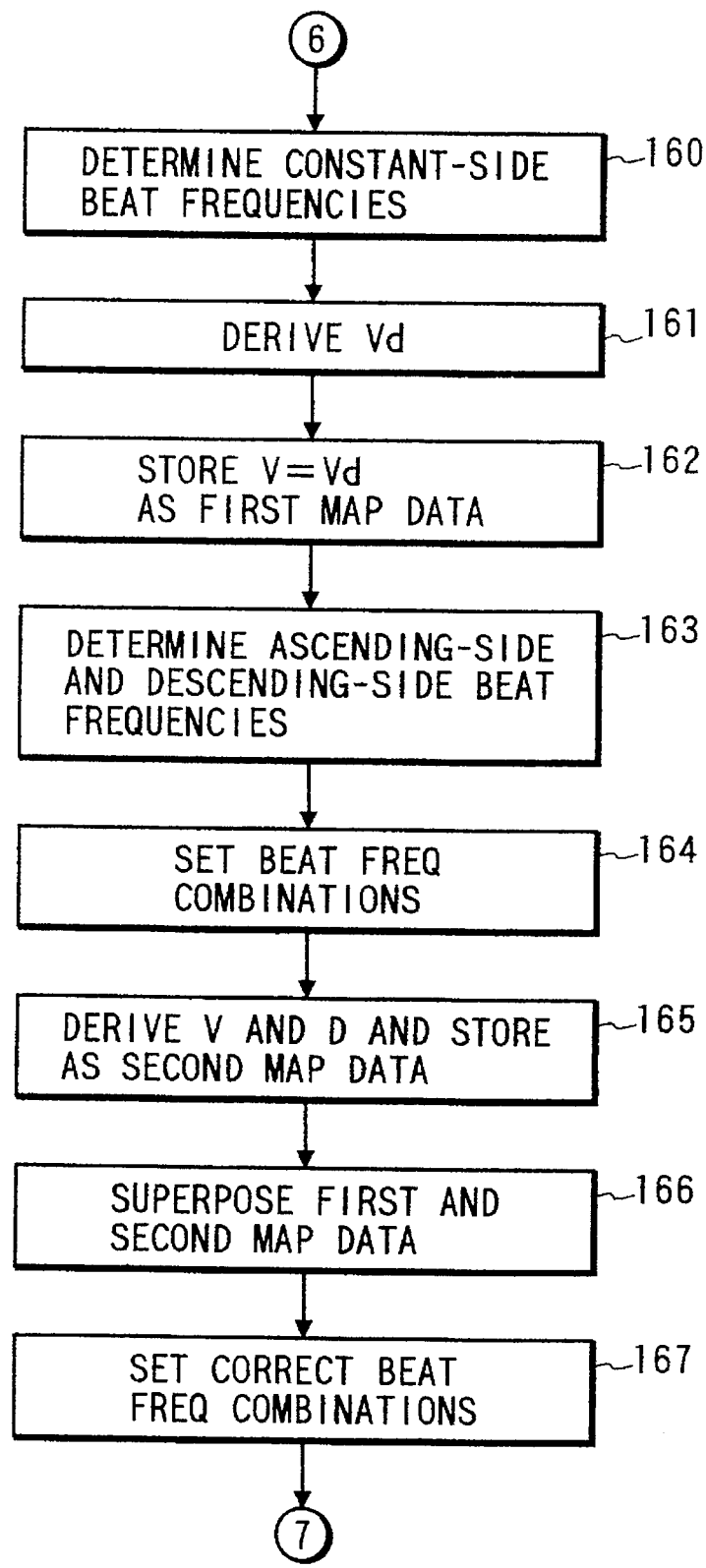
Figure 14:
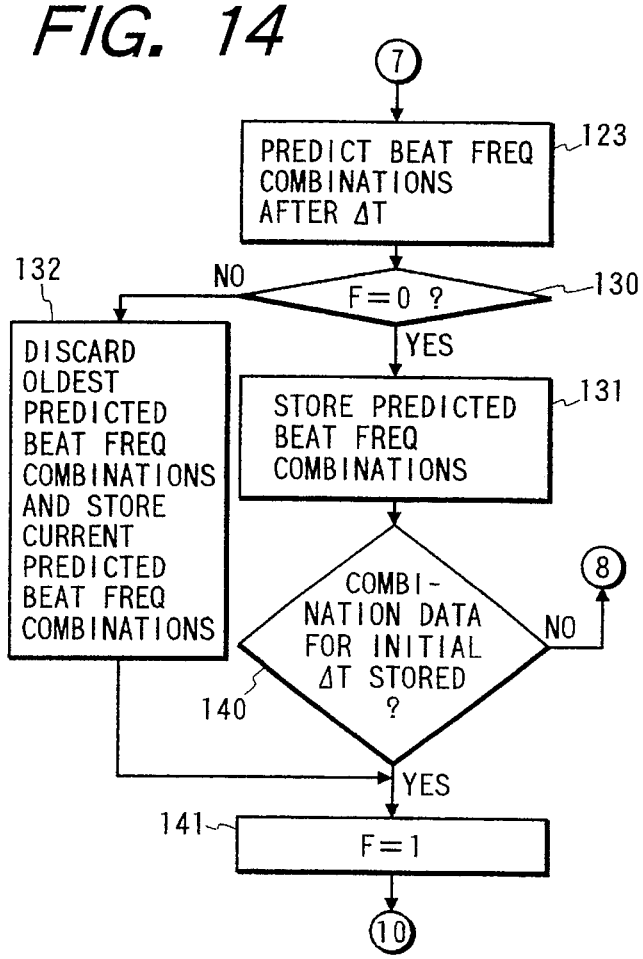

With this arrangement, the correct beat frequency combinations are temporarily selected by superposing the first and second map data, that is, based on matching between the relative velocities derived from the constant-side beat frequencies at step 161 in FIG. 13 and the relative velocities derived from the ascending-side and descending-side beat frequency combinations at step 165 in FIG. 13. Thereafter, the beat frequency combinations after ΔT are predicted at step 123 in FIG. 14 and compared with the current beat frequency combinations at step 150 in FIG. 15 so that the correct beat frequency combinations are finally selected at steps 150 and 151 in FIG. 15 based on matching of the predicted beat frequency combinations and the current beat frequency combinations. Thus, the selection of the correct beat frequency combinations can be achieved with higher accuracy.

As described above, since the flowcharts of the first and second preferred embodiments are combined in this preferred embodiment, even If the beat frequency combinations for the four targets, for example, are close to each other on the orthogonal V-D coordinate plane, the beat frequency combinations can be correctly selected for the targets.

Fourth Embodiment

Now, a fourth preferred embodiment of the present invention will be described hereinbelow. In the fourth preferred embodiment, the microcomputer 10 executes a program of a calculation routine as represented by a flowchart shown in FIGS. 16 to 19 which is a combination of the flowcharts executed in the foregoing first and second preferred embodiments. In the flowchart of the fourth preferred embodiment, steps which are the same in operation as those In the flowcharts of the first and second preferred embodiments are assigned the same step signs. The program is prestored in the ROM of the microcomputer 10. The other structure is the same as In the first preferred embodiment.

In the fourth preferred embodiment, as in the first preferred embodiment, steps 100 to 121 (see FIGS. 2 and 16), steps 122 to 141 (see FIGS. 3 and 17) and steps 150 to 153 (see FIGS. 4 and 18) are executed. As appreciated, in this preferred embodiment, step 110 in FIG. 2 is replaced by step 110B in FIG. 16 which just corresponds to step 110A in FIG. 5. Thereafter, as in the second preferred embodiment, steps 160 to 162 (see FIGS. 6 and 19) are executed. Then, at step 163A, the relative velocities V and the distances D derived at step 152 and 153 are stored as the second map data. Subsequently, steps 166 and 167 are executed as in the second preferred embodiment based on the first and second map data.

Figure 17:
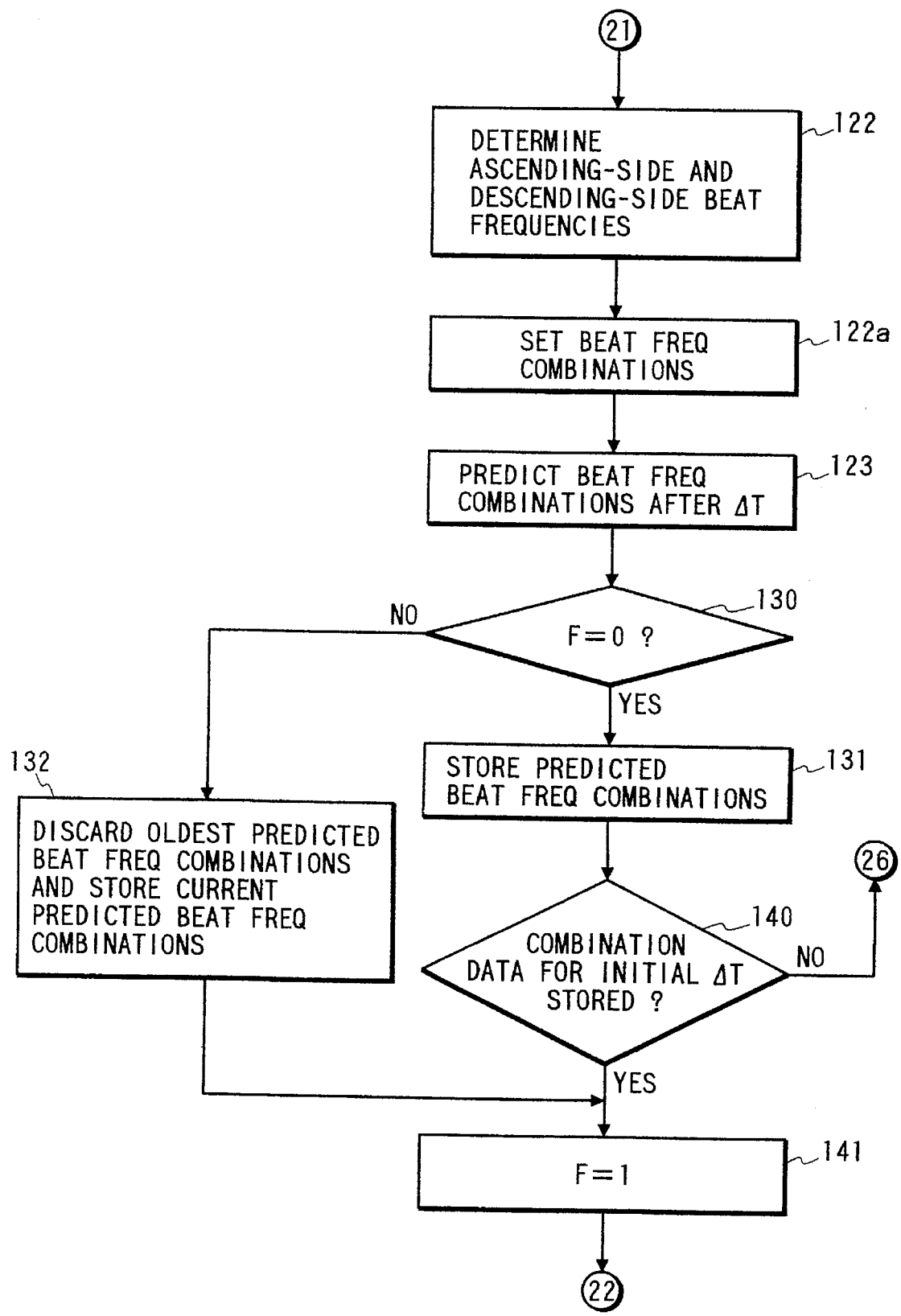
Figure 18:
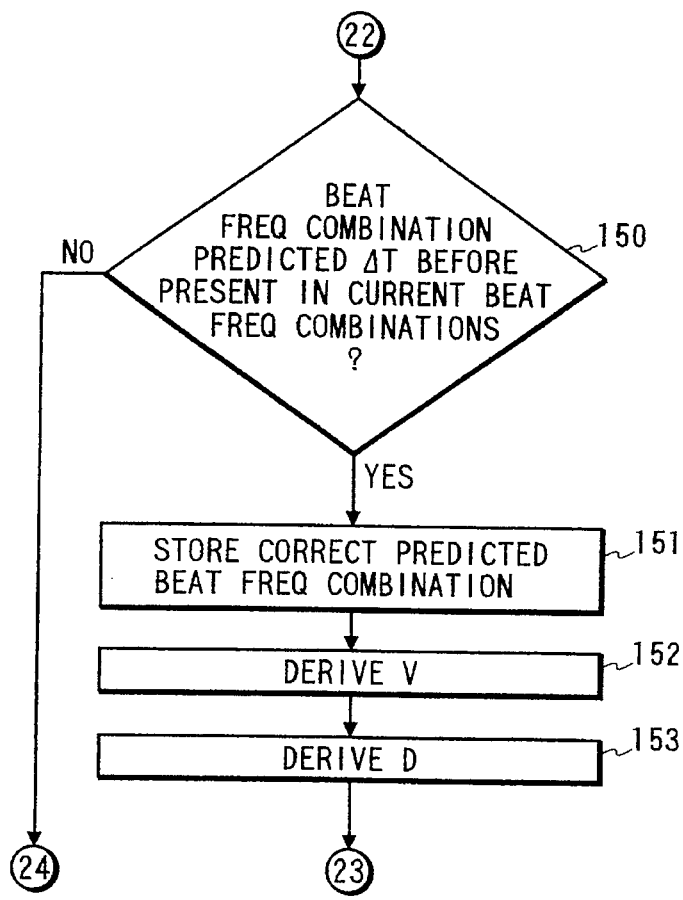

With this arrangement, the beat frequency combinations after ΔT are predicted at step 123 in FIG. 17 and compared with the current beat frequency combinations at step 150 in FIG. 18. Then, the correct beat frequency combinations are temporarily selected at steps 150 and 151 in FIG. 18 based on matching of the predicted beat frequency combinations and the current beat frequency combinations. Subsequently, the corresponding relative velocities V and the distances D are temporarily derived at steps 152 and 153 in FIG. 18. Thereafter, the correct relative velocities V and the distances D are finally determined by superposing the first and second map data, that is, based on matching between the relative velocities derived from the constant-side beat frequencies at step 161 in FIG. 19 and the relative velocities derived at step 152 in FIG. 18. Thus, the determination of the correct relative velocities and distances can be achieved with higher accuracy.

As described above, since the flowcharts of the first and second preferred embodiments are combined in this preferred embodiment, even if the relative velocities and distances of the four targets, for example, are close to each other on the orthogonal V-D coordinate plane, the determination thereof can be achieved with high accuracy.

Fifth Embodiment

Now, a fifth preferred embodiment of the present invention will be described hereinbelow. In the fifth preferred embodiment, the microcomputer 10 executes a program of a calculation routine as represented by a flowchart shown in FIGS. 2, 20 and 21. Specifically, in the fifth preferred embodiment, FIGS. 3 and 4 are replaced by FIGS. 20 and 21. The other structure is the same as in the first preferred embodiment. In the flowchart of the fifth preferred embodiment, steps which are the same in operation as those in the flowchart of the first preferred embodiments are assigned the same step signs. The program is prestored in the ROM of the microcomputer 10.

In the fifth preferred embodiment, when the beat frequency combinations are set at step 122a (see FIGS. 3 and 20) as in the first preferred embodiment, step 123A derives relative velocities V and distances D for the respective beat frequency combinations set at step 122a, using the first and second equations (1) and (2). Then, at step 123B, relative velocities V and distances D after ΔT are predicted based on the relative velocities V and distances D derived at step 123A, using the equations (3) and (4). Subsequently, if answer at step 130 is positive, the routine proceeds to step 131A where the relative velocities V and distances D predicted at step 123B are stored in combination in the RAM of the microcomputer 10.

If answer at step 140 is negative, the execution of steps 110 to 131A is repeated until answer at step 140 becomes positive. Specifically, if the data corresponding to the initial given time ΔT is stored in the RAM at step 131A, step 140 produces positive answer so that the routine proceeds to step 141 where the flag F is set to 1 (F=1).

Subsequently, at step 150A, the combinations of the relative velocities V and distances D which were predicted at step 123B ΔT before are compared with the combinations of the current relative velocities V and distances D derived at step 123A one by one. If the compared predicted V-D combination falls within a given rage of one of the current V-D combinations, step 150A yields positive answer so that the routine proceeds to step 151A. Specifically, if the relative velocity and distance of the compared predicted V-D combination coincide with those of one of the current V-D combinations, respectively, or fall in the neighborhood of them, respectively, step 150A yields positive answer meaning that the compared predicted V-D combination is correct.

At step 151A, the compared predicted V-D combination determined to be correct at step 150A is set as a correct V-D combination.

In the fifth preferred embodiment, since the V-D combinations are used through steps 123A to 151A rather than the beat frequency combinations, the calculation volume can be reduced while effects similar to those in the foregoing first preferred embodiment can be achieved.

In the fifth preferred embodiment, it may be arranged that at least one of the relative velocity V and the distance D is used through steps 123A to 151A, and the other of the relative velocity V and the distance D is derived based on the beat frequency combination corresponding to one of the correct relative velocity V and distance D set at step 151A. This arrangement further reduces the calculation volume.

Figure 20:
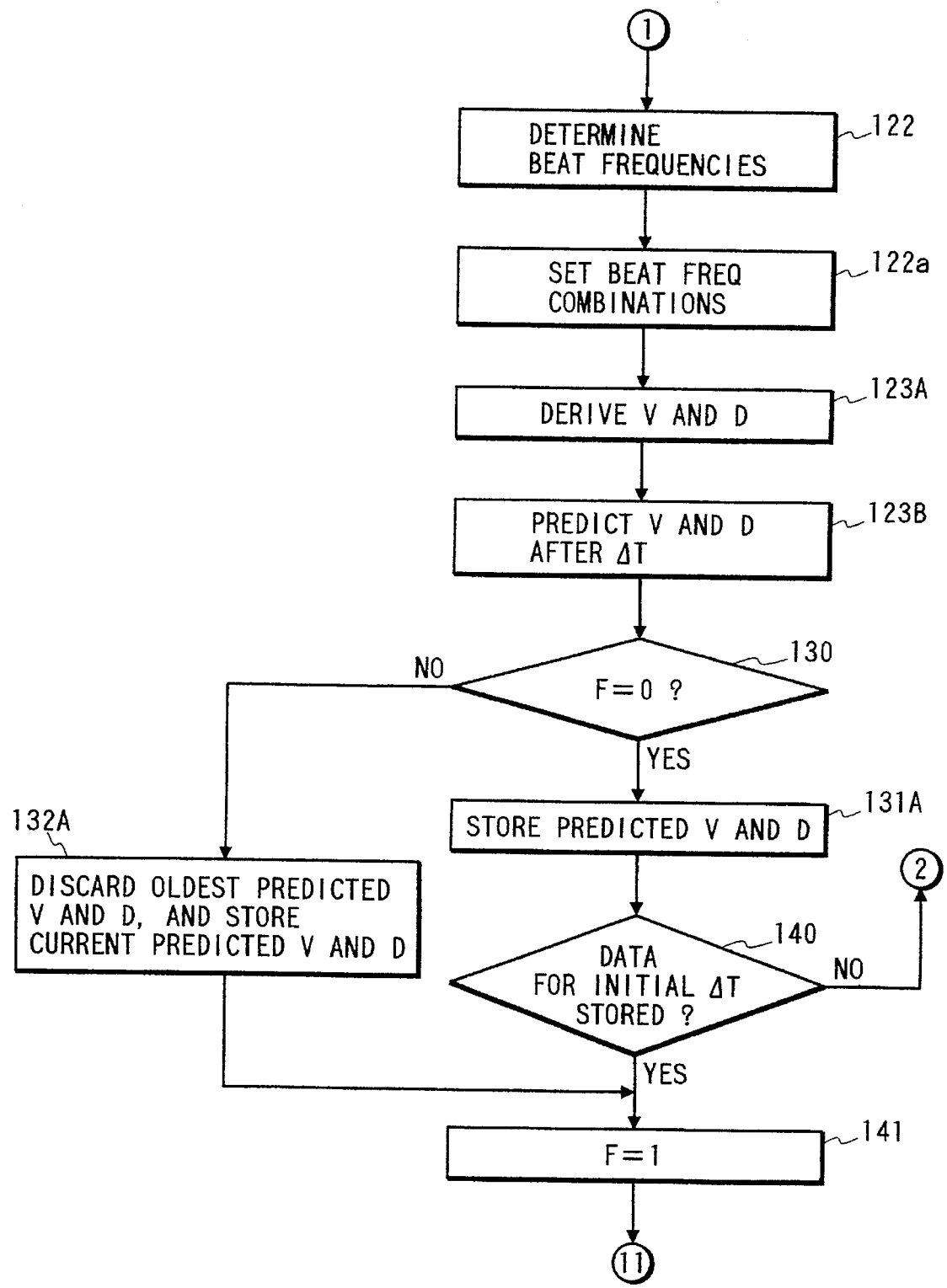

Further, in the fifth preferred embodiment, FIGS. 3 and 4 of the first preferred embodiment are replaced by FIGS. 20 and 21. On the other hand, it may also be arranged that FIGS. 14 and 15 of the third preferred embodiment are replaced by steps 123B to 151A of FIGS. 20 and 21 with a modification that step 167 in FIG. 13 sets the correct relative velocities V and distances D rather than the correct beat frequency combinations.

Sixth Embodiment

Figure 19:
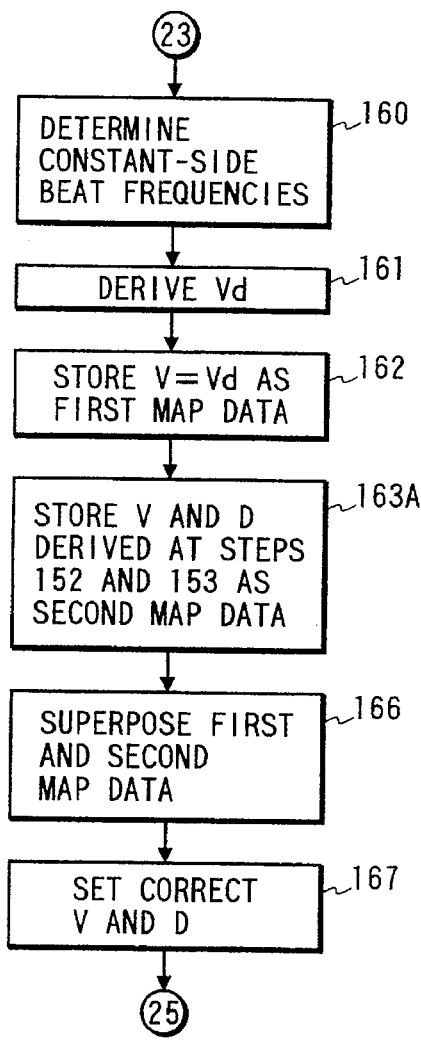
Figure 23:
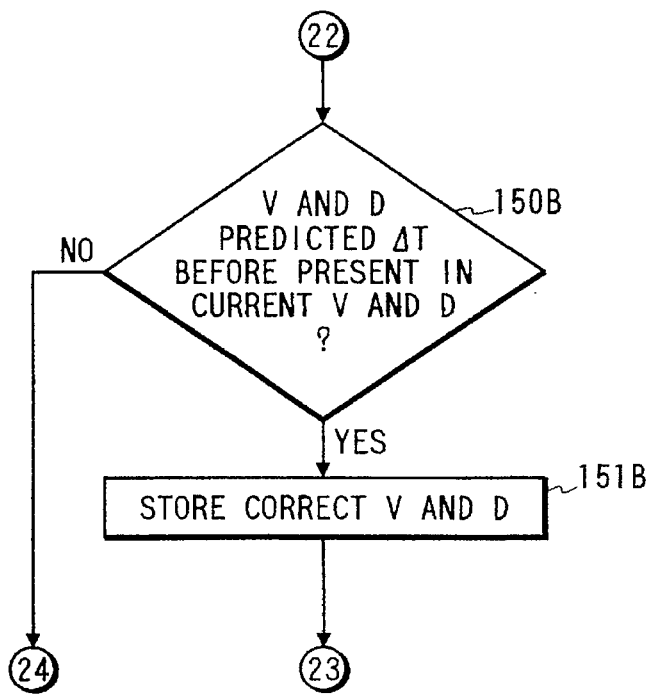
Figure 24:
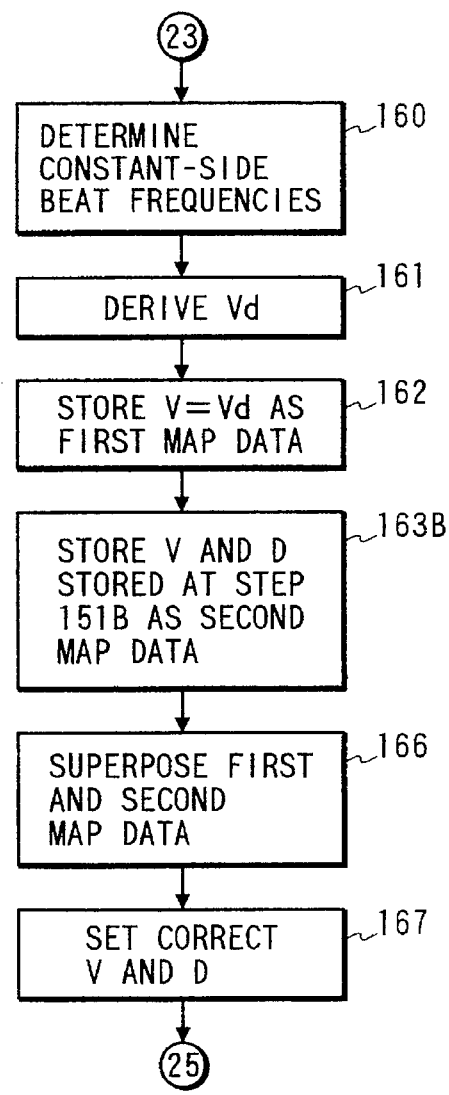

Now, a sixth preferred embodiment of the present invention will be described hereinbelow. In the sixth preferred embodiment, the microcomputer 10 executes a program of a calculation routine as represented by a flowchart shown in FIGS. 16 and 22 to 24. Specifically, in the sixth preferred embodiment, FIGS. 17 to 19 are replaced by FIGS. 22 to 24. The other structure is the same as in the fourth preferred embodiment. In the flowchart of the sixth preferred embodiment, steps which are the same in operation as those in the flowchart of the fourth preferred embodiments are assigned the same step signs. The program is prestored in the ROM of the microcomputer 10.

In the sixth preferred embodiment, when the beat frequency combinations are set at step 122a (see FIGS. 17 and 22) as in the fourth preferred embodiment, step 123A derives relative velocities V and distances D for the respective beat frequency combinations set at step 122a, using the first and second equations (1) and (2). Then, at step 123C, relative velocities V and distances D after ΔT are predicted based on the relative velocities V and distances D derived at step 123A, using the equations (3) and (4). Subsequently, if answer at step 130 is positive, the routine proceeds to step 131B where the relative velocities V and distances D predicted at step 123C are stored in combination in the RAM of the microcomputer 10.

If answer at step 140 is negative, the execution of steps 110 to 131B is repeated until answer at step 140 becomes positive. Specifically, if the data corresponding to the initial given time ΔT is stored in the RAM at step 131B, step 140 produces positive answer so that the routine proceeds to step 141 where the flag F is set to 1 (F=1).

Subsequently, at step 150B, the combinations of the relative velocities V and distances D which were predicted at step 123C ΔT before are compared with the combinations of the current relative velocities V and distances D derived at step 123A one by one. If the compared predicted V-D combination falls within a given range of one of the current V-D combinations, step 150B yields positive answer so that the routine proceeds to step 151B. Specifically, if the relative velocity and distance of the compared predicted V-D combination coincide with those of one of the current V-D combinations, respectively, or fall In the neighborhood of them, respectively, step 150B yields positive answer meaning that the compared predicted V-D combination is correct.

At step 151B, the compared predicted V-D combination determined to be correct at step 150B is set as a temporary correct V-D combination. Thereafter, steps 160 to 167 (see FIGS. 19 and 24) are executed as In the fourth preferred embodiment so as to finally determine the correct V-D combinations. As appreciated, step 163B in FIG. 24 stores the relative velocities V and distances D stored at step 151B as the second map data.

In the sixth preferred embodiment, since the V-D combinations are used as in the foregoing fifth preferred embodiment rather than the beat frequency combinations, the calculation volume can be reduced while effects similar to those in the foregoing first preferred embodiment can be achieved.

While the present invention has been described in terms of the preferred embodiments, the invention Is not to be limited thereto, but can be embodied In various ways without departing from the principle of the Invention as defined In the appended claims.

For example, the present invention can be applied not only to the vehicles, but also to various movable bodies, such as ships. Further, each step in the flowcharts executed in the foregoing preferred embodiments can be-realized by a hard logic circuit.

What is claimed is:

1. An FM-CW radar system comprising:

transmission signal generating means for generating a transmission signal which is frequency-modulated by a modulating signal having a waveform including an ascending portion and a descending portion;

transmitter-receiver means for transmitting said transmission signal as a radio wave and receiving said radio wave reflected back thereto so as to produce a received signal;

mixing means for mixing said transmission signal and said received signal to produce a beat signal;

beat frequency selecting means for selecting ascending-side and descending-side beat frequencies at regions of said beat signal corresponding to said ascending portion and said descending portion of said modulating signal;

beat frequency predicting means for pairing said ascending-side and descending-side beat frequencies one by one from each side so as to provide first beat frequency combinations and predicting second beat frequency combinations indicative of said first beat frequency combinations after a given time based on said first beat frequency combinations, respectively, said ascending-side and descending-side beat frequencies representing a plurality of targets which reflect back said radio wave to said transmitter-receiver means;

setting means for setting such second beat frequency combinations as correct beat frequency combinations, said second beat frequency combinations, set by said setting means, each having the ascending-side beat frequency and the descending-side beat frequency which fall in a given range of one of ascending-side beat frequencies and a given range of one of descending-side beat frequencies, respectively, of a beat signal selected by said beat frequency selecting means after said given time; and deriving means for deriving information about the corresponding targets based on said correct beat frequency combinations set by said setting means.

2. The FM-CW radar system according to claim 1, wherein said beat frequency predicting means predicts said second beat frequency combinations based on third beat frequency combinations which are selected from said first beat frequency combinations.

3. The FM-CW radar system according to claim 2, wherein the waveform of said modulating signal further includes a constant portion in addition to said ascending and descending portions, wherein said beat frequency predicting means derives first relative velocities of said targets based on constant-side beat frequencies at a region of the beat signal corresponding to said constant portion of said modulating signal, said beat frequency predicting means further deriving second relative velocities based on said first beat frequency combinations, wherein said beat frequency predicting means compares said second relative velocities with said first relative velocities, respectively, for selecting such second relative velocities each of which substantially matches one of said first relative velocities, and wherein said beat frequency predicting means derives said third beat frequency combinations from said second relative velocities selected by said beat frequency predicting means.

4. The FM-CW radar system according to claim 1, wherein the waveform of said modulating signal further includes a constant portion in addition to said ascending and descending portions, wherein said information about the corresponding targets includes first relative velocities of said targets, wherein said beat frequency predicting means further derives second relative velocities of said targets based on constant-side beat frequencies at a region of the beat signal corresponding to said constant portion of said modulating signal, and wherein said setting means compares said first relative velocities with said second relative velocities, respectively, for selecting such first relative velocities each substantially matching one of said second relative velocities as information of the corresponding targets.

5. An FM-CW radar system comprising:

transmission signal generating means for generating a transmission signal which is frequency-modulated by a modulating signal having a waveform including an ascending portion and a descending portion;

transmitter-receiver means for transmitting said transmission signal as a radio wave and receiving said radio wave reflected back thereto so as to produce a received signal;

mixing means for mixing said transmission signal and said received signal to produce a beat signal;

beat frequency selecting means for selecting ascending-side and descending-side beat frequencies at regions of said beat signal corresponding to said ascending portion and said descending portion of said modulating signal;

target information predicting means for pairing said ascending-side and descending-side beat frequencies one by one from each side so as to provide beat frequency combinations, said ascending-side and descending-side beat frequencies representing a plurality of targets which reflect back said radio wave to said transmitter-receiver means, said target information predicting means deriving first values, each representing one of a first relative velocity and a distance of the target, from said beat frequency combinations, said target information predicting means predicting second values indicative of said first values after a given time based on said first values, respectively; and setting means for setting such second values as correct values indicative of the corresponding targets, said second values, set by said setting means, each falling in a given range of one of said first values derived by said target information predicting means after said given time.

6. The FM-CW radar system according to claim 5, wherein each of said first values represents the first relative velocity, wherein the waveform of said modulating signal further includes a constant portion in addition to said ascending and descending portions, wherein said target information predicting means derives second relative velocities of said targets based on constant-side beat frequencies at a region of the beat signal corresponding to said constant portion of said modulating signal, and wherein said setting means compares said second values, set by said setting means, with said second relative velocities, respectively, for selecting such second values each substantially matching one of said second relative velocities as finally correct relative velocities of the corresponding targets.

7. An FM-CW radar system comprising:

transmission signal generating means for generating a transmission signal which is frequency-modulated by a modulating signal having a waveform including a constant portion, an ascending portion and a descending portion;

transmitter-receiver means for transmitting said transmission signal as a radio wave and receiving said radio wave reflected back thereto so as to produce a received signal;

mixing means for mixing said transmission signal and said received signal to produce a beat signal;

beat frequency selecting means for selecting constant-side, ascending-side and descending-side beat frequencies at regions of said beat signal corresponding to said constant portion, said ascending portion and said descending portion of said modulating signal;

first deriving means for deriving a first relative velocity from each of said constant-side beat frequencies, said constant-side, ascending-side and descending-side beat frequencies representing a plurality of targets which reflect back said radio wave to said transmitter-receiver means;

second deriving means for pairing said ascending-side and descending-side beat frequencies one by one from each side so as to provide beat frequency combinations and deriving a second relative velocity from each of said beat frequency combinations; and setting means for setting such second relative velocities as correct relative velocities indicative of the corresponding targets, said second relative velocities, set by said setting means, each substantially matching one of said first relative velocities.

8. The FM-CW radar system according to claim 7, further comprising third deriving means for deriving a third relative velocity from each of said second relative velocities set by said setting means, said third relative velocities indicative of the corresponding second relative velocities after a given time, respectively, and wherein said setting means sets such third relative velocities as finally correct relative velocities, said third relative velocities, set by said setting means, each falling in a given range of one of said second relative velocities set by said setting means after said given time.

9. An FM-CW radar system comprising:

transmission signal generating means for generating a transmission signal which is frequency-modulated by a modulating signal having a waveform including a constant portion, an ascending portion and a descending portion;

transmitter-receiver means for transmitting said transmission signal as a radio wave and receiving said radio wave reflected back thereto so as to produce a received signal;

mixing means for mixing said transmission signal and said received signal to produce a beat signal;

beat frequency selecting means for selecting constant-side, ascending-side and descending-side beat frequencies at regions of said beat signal corresponding to said constant portion, said ascending portion and said descending portion of said modulating signal;

first deriving means for deriving a first relative velocity from each of said constant-side beat frequencies, said constant-side, ascending-side and descending-side beat frequencies representing a plurality of targets which reflect back said radio wave to said transmitter-receiver means;

second deriving means for pairing said ascending-side and descending-side beat frequencies one by one from each side so as to provide beat frequency combinations and deriving a second relative velocity from each of said beat frequency combinations;

first setting means for setting as first beat frequency combinations such beat frequency combinations each of which renders the corresponding second relative velocity derived by said second deriving means substantially match one of said first relative velocities;

beat frequency predicting means for predicting second beat frequency combinations indicative of said first beat frequency combinations after a given time based on said first beat frequency combinations, respectively;

second setting means for setting such second beat frequency combinations as third beat frequency combinations, said second beat frequency combinations, set by said second setting means, each having the ascending-side beat frequency and the descending-side beat frequency which fall in a given range of one of ascending-side beat frequencies and a given range of one of descending-side beat frequencies, respectively, of said first beat frequency combinations set by said first setting means after said given time; and deriving means for deriving information about the corresponding targets based on said third beat frequency combinations set by said second setting means.

10. An FM-CW radar system comprising:

transmission signal generating means for generating a transmission signal which is frequency-modulated by a modulating signal having a waveform including a constant portion, an ascending portion and a descending portion;

transmitter-receiver means for transmitting said transmission signal as a radio wave and receiving said radio wave reflected back thereto so as to produce a received signal;

mixing means for mixing said transmission signal and said received signal to produce a beat signal;

beat frequency selecting means for selecting constant-side, ascending-side and descending-side beat frequencies at regions of said beat signal corresponding to said constant portion, said ascending portion and said descending portion of said modulating signal;

beat frequency predicting means for pairing said ascending-side and descending-side beat frequencies one by one from each side so as to provide first beat frequency combinations and predicting second beat frequency combinations indicative of said first beat frequency combinations after a given time based on said first beat frequency combinations, respectively, said constant-side, ascending-side and descending-side beat frequencies representing a plurality of targets which reflect back said radio wave to said transmitter-receiver means;

first setting means for setting such second beat frequency combinations as third beat frequency combinations, said second beat frequency combinations, set by said first setting means, each having the ascending-side beat frequency and the descending-side beat frequency which fall in a given range of one of ascending-side beat frequencies and a given range of one of descending-side beat frequencies, respectively, of a beat signal selected by said beat frequency selecting means after said given time;

first deriving means for deriving a first relative velocity from each of said constant-side beat frequencies;

second deriving means for deriving a second relative velocity from each of said third beat frequency combinations; and second setting means for setting as correct relative velocities such second relative velocities each of which substantially matches one of said first relative velocities.

\* \* \* \* \*